US012783396B2

(12) United States Patent
Schilcher et al.

(10) Patent No.: US 12,783,396 B2
(45) Date of Patent: Nov. 3, 2026

(54) ARCHITECTURE AND COMPUTING ENVIRONMENT FOR ISOLATED AND CONTROLLED CODE REVIEW

(71) Applicant: Oracle International Corporation, Redwood Shores, CA (US)

(72) Inventors: Ryan Daniel Schilcher, Seattle, WA (US); Peter Martin Hanily, Dublin (IE); Joel Russell, Washington, DC (US); Nicholas Benedetti, Baltimore, MD (US)

(73) Assignee: Oracle International Corporation, Redwood Shores (CA)

( * ) Notice: Subject to any disclaimer, the term of this patent is extended or adjusted under 35 U.S.C. 154(b) by 262 days.

(21) Appl. No.: 18/664,633

(22) Filed: May 15, 2024

(65) Prior Publication Data

US 2025/0355791 A1 Nov. 20, 2025

(51) Int. Cl.
*G06F 11/3698* (2025.01)
*G06F 9/455* (2018.01)
(Continued)

(52) U.S. Cl.
CPC ...... *G06F 11/3698* (2025.01); *G06F 9/45558* (2013.01); *G06F 11/3696* (2013.01);
(Continued)

(58) Field of Classification Search
CPC ............. G06F 11/3696; G06F 11/3698; G06F 21/53; G06F 21/577; G06F 2009/45562;
(Continued)

(56) References Cited

U.S. PATENT DOCUMENTS 8,959,485 B2 2/2015 Kvartskhava et al.
10,009,370 B1 6/2018 Douglas et al.
(Continued)

FOREIGN PATENT DOCUMENTS

CA 3221836 A1 2/2023

OTHER PUBLICATIONS

International Search Report and Written Opinion for PCT Application No. PCT/US2025/027441, dated Jul. 2, 2025.
(Continued)

*Primary Examiner* — Marina Lee
(74) *Attorney, Agent, or Firm* — Mughal Gaudry & Franklin PC

(57) ABSTRACT

Cloud computing architecture is described for implementing test modules in a communication-controlled cloud environment with access to private data. The test modules perform synchronous tests on the private data and export test results to an analytic environment subject to data export policies. An analytic application is used to asynchronously analyze the test results in the analytic environment. The cloud computing architecture alternatively or additionally includes an interface for deploying investigation-bound cloud environments in restricted subnets. A collection of software is instantiated in the investigation-bound cloud environment, and the investigation-bound cloud environment may be accessed with remote access credentials using a remote access protocol for testing the collection of software. Information about the investigation-bound cloud environment displayed in the analytic application, and the analytic application and the restricted subnet are forcibly deleted when the investigation is complete.

21 Claims, 14 Drawing Sheets

(51) Int. Cl.

| | |
|---|---|
| ***G06F 11/3668*** | (2025.01) |
| ***G06F 21/53*** | (2013.01) |
| ***H04L 9/40*** | (2022.01) |

(52) U.S. Cl.
CPC .............. *G06F 21/53* (2013.01); *H04L 63/08* (2013.01); *H04L 63/101* (2013.01); *G06F 2009/45562* (2013.01); *G06F 2009/45587* (2013.01)

(58) Field of Classification Search
CPC ............ G06F 2009/45587; G06F 2009/45558; H04L 63/08; H04L 63/101
See application file for complete search history.

(56) References Cited

U.S. PATENT DOCUMENTS

| | | | | |
|---|---|---|---|---|
| 10,552,591 | B2 | 2/2020 | Ganta et al. | |
| 10,761,913 | B2 * | 9/2020 | McClory | G06F 11/3684 |
| 12,182,598 | B1 * | 12/2024 | Johnson | G06F 8/60 |
| 12,445,419 | B2 * | 10/2025 | Adogla | G06F 9/45558 |
| 2004/0210872 | A1 * | 10/2004 | Dorr | G06F 11/3636 717/124 |
| 2012/0265824 | A1 | 10/2012 | Lawbaugh | |
| 2014/0379677 | A1 * | 12/2014 | Driesen | G06F 16/245 707/723 |
| 2015/0143524 | A1 | 5/2015 | Chestna | |
| 2016/0055077 | A1 | 2/2016 | Baloch et al. | |
| 2017/0353458 | A1 | 12/2017 | Lipke et al. | |
| 2018/0095778 | A1 * | 4/2018 | Aydelott | G06F 9/5055 |
| 2018/0329788 | A1 | 11/2018 | Blum et al. | |
| 2019/0266072 | A1 | 8/2019 | Ge et al. | |
| 2019/0286832 | A1 | 9/2019 | Szeto et al. | |
| 2020/0089881 | A1 | 3/2020 | Graun et al. | |
| 2020/0117434 | A1 | 4/2020 | Biskup et al. | |
| 2020/0379885 | A1 | 12/2020 | Englehart et al. | |
| 2021/0173918 | A1 | 6/2021 | Khurana et al. | |
| 2024/0289264 | A1 | 8/2024 | Desai | |
| 2025/0284615 | A1 | 9/2025 | Chhabra et al. | |

OTHER PUBLICATIONS

International Search Report and Written Opinion for PCT Application No. PCT/US2025/027442, dated Jul. 2, 2025.

Whizlabs, "What is AWS Cloud Sandbox?—Benefits of Whizlabs AWS Cloud Sandbox Whizlabs", retrieved from the Internet via https://www.youtube.com/watch?v=Bq9UXMtxves, Feb. 6, 2023.

Chia-Chang et al., "GSLAC: GPU Software Level Access Control for Information Isolation on Cloud Platforms," 2023. 2023 IEEE International Conference on Cloud Computing Technology and Science (CloudCom), Naples, Italy, pp. 34-41. DOI: 10.1109/CloudCom59040.2023.00019.

Notice of Allowance for U.S. Appl. No. 18/664,630 notified Apr. 21, 2026.

* cited by examiner

ARCHITECTURE AND COMPUTING ENVIRONMENT FOR ISOLATED AND CONTROLLED CODE REVIEW

BACKGROUND

Companies will go to great lengths to ensure their software and data is secure. Data breaches and cyberattacks occur thousands of times per day and often multiple times per minute. Data breaches and cyberattacks often cost companies millions of dollars. Dealing with data breaches and cyberattacks after-the-fact requires triaging to confirm what breach happened, mitigate further loss, identify any sensitive data that was stolen, re-secure logins, passwords, certificates, tokens, and other authentication pathways, contact impacted parties, and file mandatory reports.

For software companies, software and data security are even more important. Compromised software released by one company could impact potentially hundreds or thousands of companies and potentially millions or billions of customers, depending on the reach of the software across the industry. For this reason, software companies must be even more careful that their products and services are not exposing their customers.

In some scenarios, customers of software companies can cause data breaches that impact other customers. If the software company allows the customer to use or modify certain computing resources, without the proper security review and boundaries in place, the customer may create back door pathways into those computing resources that impact the service provider more generally.

For at least these reasons, companies should be cautious of the code bases they use to host their data. In particular, software companies should carefully consider and analyze any code that they allow to be part of their code base, as compromised code can cause data breaches not just for their own company but also for other companies. As software companies collaborate to accomplish greater goals, not all companies will be applying the same level of caution with respect to their expansive code bases.

Many large-scale software projects are developed over several years, with hundreds or even thousands of contributors contributing to potentially millions or even billions of lines of code across thousands or even millions of source files. Such large-scale software projects bring huge benefits to their implementers, who may be from different companies. For example, the software projects may provide interfaces to use new technologies, and often provide new security safeguards that account for known security vulnerabilities of the past. These improvements are part of the constant march of software progress. However, large-scale software projects with millions of lines of code cannot practically be analyzed for every possible security issue. Such projects may already be compromised without the knowledge of the implementers, awaiting the next significant data breach. Currently, implementers of large-scale software projects manually review as much of the code as possible, at great time and expense, but may still miss the compromised code that eventually causes a data breach. By the time the code is finally reviewed, the code may have already changed significantly, leaving the involved companies always guessing whether there are any security issues in the code.

BRIEF SUMMARY

In some embodiments, a computer-implemented method implements test modules in a communication-controlled cloud environment with access to private data. The test modules perform synchronous tests on the private data and export test results to an analytic environment subject to data export policies. An analytic application is used to asynchronously analyze the test results in the analytic environment. Alternatively or additionally, a computer-implemented method includes deploying investigation-bound cloud environments in restricted subnets. A collection of software is instantiated in the investigation-bound cloud environment, and the investigation-bound cloud environment may be accessed with remote access credentials using a remote access protocol for testing the collection of software. Information about the investigation-bound cloud environment displayed in the analytic application, and the investigation-bound cloud environment and the restricted subnet are forcibly deleted when the investigation is complete.

In one embodiment, a computer-implemented method includes configuring a testing agent comprising one or more test modules in a communication-controlled cloud environment. The one or more test modules are configured to access and analyze source code of one or more software collections at least temporarily accessible from the communication-controlled cloud environment subject to one or more data export policies of the communication-controlled cloud environment. The computer-implemented method further includes receiving at least temporary access to a particular software collection for review within the communication-controlled cloud environment. Without providing, to an analytic environment outside the communication-controlled cloud environment, access to the particular software collection, the computer-implemented method uses the configured testing agent within the communication-controlled cloud environment to cause the one or more test modules to perform one or more tests on particular source code of the particular software collection at least temporarily accessible for review within the communication-controlled cloud environment. The one or more tests generate one or more code test results that depend on the particular source code of the particular software collection as analyzed by the one or more tests. The computer-implemented method further includes determining whether the one or more test results can be communicated outside the communication-controlled cloud environment based at least in part on the one or more data export policies. The one or more data export policies place one or more limits on communication of code test results data outside the communication-controlled cloud environment. The one or more limits prevent exporting full source code of the particular software collection. The computer-implemented method further includes determining that the one or more test results are within the one or more limits, and based at least in part on determining that the one or more test results are within the one or more limits, receiving and persistently storing the one or more test results for review in the analytic environment outside the communication-controlled cloud environment.

In a further embodiment, receiving at least temporary access to the particular software collection for review includes receiving access to a shared resource for which access expires at a fixed time. The method further includes determining that the fixed time has expired, and revoking the access to the shared resource based at least in part on determining that the fixed time has expired.

In the same or a different further embodiment, determining that the one or more test results are within the one or more limits is performed by the testing agent in the communication-controlled cloud environment. The one or more test modules communicate externally through the testing agent. The testing agent communicates externally through a gateway at an edge of a network of the communication-controlled cloud environment. The gateway also determines whether the one or more test results are within certain limits.

In the same or a different further embodiment, determining that the one or more test results are within the one or more limits is performed by a gateway at an edge of a network of the communication-controlled cloud environment. The one or more limits include a limit on a quantity of data communicated outside the communication-controlled environment within a fixed period of time.

In the same or a different further embodiment, at least one of the one or more test modules operate as a worker node in a Kubernetes cluster. The method further includes deleting the worker node after performing at least one of the one or more tests on the particular source code of the particular software collection.

In the same or a different further embodiment, the method further includes receiving a new test module configured to access and analyze source code of one or more software collections at least temporarily accessible from the communication-controlled cloud environment, and adding the new test module to the one or more test modules that are active for the communication-controlled cloud environment. The use of the configured testing agent within the communication-controlled cloud environment to cause the one or more test modules to perform one or more tests on particular source code of the particular software collection automatically uses all test modules that are active for the communication-controlled cloud environment to test the particular software collection.

In the same or a different further embodiment, the one or more test results include a hash of the source code or a portion of the source code and an indicator of whether a particular string is present or not in the source code. The method further includes causing display, in an analytic application interface, of the hash of the source code or the portion of the source code and the indicator of whether the particular string is present or not in the source code or the portion of the source code.

In the same or a different further embodiment, the one or more test results include an indication of whether one or more function calls or resource paths were used by the source code or a portion of the source code. The method further includes causing display, in an analytic application interface, of the indication of whether the one or more function calls or resource paths were used by the source code or the portion of the source code, and one or more other items of source code that used the one or more function calls or resource paths.

In the same or a different further embodiment, the one or more test results include an entropy determined for at least a portion of the source code. The method further includes causing display, in an analytic application interface, of the entropy determined for at least the portion of the source code, and one or more other entropies determined for one or more other items of source code.

In the same or a different further embodiment, the method further includes receiving and persistently storing a plurality of test results from a plurality of communication-controlled environments for review in the analytic environment outside the plurality of communication-controlled environments. The plurality of communication-controlled environments include environments for analyzing code from different tenancies. The method further includes causing display, in an analytic application interface, of information about the plurality of test results from the plurality of communication-controlled environments. The method further includes causing display, in the analytic application interface, of an indicator of compromise that is detected in code from different tenancies belonging to different data originating cloud entities.

In another embodiment, a computer-implemented method includes accessing, by a cloud management system, a set of configuration parameters defining one or more constraints for an investigation into functionality of a collection of software. The computer-implemented method further includes, based at least in part on the one or more constraints, generating, by the cloud management system, an investigation-bound cloud environment for conducting the investigation into functionality of the collection of software. The investigation-bound cloud environment is bound by the one or more constraints. The investigation-bound cloud environment is in a restricted subnet that is isolated from other cloud environments. The investigation-bound cloud environment is configured with remote access credentials. The computer-implemented method further includes instantiating, by the cloud management system, an instance of the collection of software in the investigation-bound cloud environment. The computer-implemented method further includes causing display, on a user interface, of information about the investigation-bound cloud environment and one or more other investigation-bound cloud environments. The user interface includes a remote access option for the investigation-bound cloud environment. The remote access option for the investigation-bound cloud environment retrieves remote access credentials stored in association with the investigation-bound cloud environment. The remote access credentials are operable to remotely access the investigation-bound cloud environment using a remote access protocol. The computer-implemented method further includes determining that the investigation is complete, and, in response to determining that the investigation is complete, forcing a deletion of the investigation-bound cloud environment and the restricted subnet.

In the same or a different further embodiment, the one or more constraints comprise an expiration time for the investigation. The method further includes comparing the expiration time with an up time of the investigation-bound cloud environment. The method performs determining that the investigation is complete based at least in part on the comparison.

In the same or a different further embodiment, the method includes performing one or more automated steps as part of the investigation. The method performs determining that the investigation is complete at least in part by determining that the one or more automated steps have been completed.

In the same or a different further embodiment, the method performs forcing a deletion the investigation-bound cloud environment and the restricted subnet at least in part by preserving, by the cloud management system, a log of when the investigation-bound cloud environment existed and the collection of software used in the investigation-bound cloud environment.

In the same or a different further embodiment, the user interface includes a displayed option to mark completion of the investigation-bound cloud environment. The method performs determining that the investigation is complete at least in part by accessing a user-selection of the displayed option to mark the completion of the investigation-bound cloud environment.

In the same or a different further embodiment, the user interface includes a displayed option to enable Internet access for the investigation-bound cloud environment. The method further includes configuring one or more virtual network resources in the investigation-bound cloud environment to provide monitored Internet access based at least in part on a selection of the displayed option to enable Internet access for the investigation-bound cloud environment.

In the same or a different further embodiment, the user interface includes a displayed option to share access to the investigation-bound cloud environment with one or more other users. The method further includes accessing a selection of the displayed option to share access to the investigation-bound cloud environment with a user-specified one or more other users, and, based at least in part on accessing the selection, enabling access to the investigation-bound cloud environment to the one or more other users by modifying database permissions so the investigation-bound cloud environment is an accessible database object for the one or more other users.

In the same or a different further embodiment, the method further includes accessing a displayed option to delete a group of investigation-bound cloud environments. The group of investigation-bound cloud environments includes the investigation-bound cloud environment. The method performs determining that the investigation is complete at least in part by accessing a user-selection of the displayed option to delete the group of the investigation-bound cloud environments.

In the same or a different further embodiment, the investigation-bound cloud environment and the one or more other investigation-bound cloud environments are from different tenancies managed by a tenancy of the cloud management system. The investigation-bound cloud environment and the one or more other investigation-bound cloud environments are accessible to one or more overlapping users of the tenancy of the cloud management system.

In the same or a different further embodiment, the user interface further includes an option to automatically deploy, with a single selection, a particular investigation-bound cloud environment with a predefined, non-user-specified set of configuration parameters defining one or more constraints to be placed on an investigation using a predefined, non-user-specified collection of software.

In various aspects, a system is provided that includes one or more data processors and a non-transitory computer-readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1A:
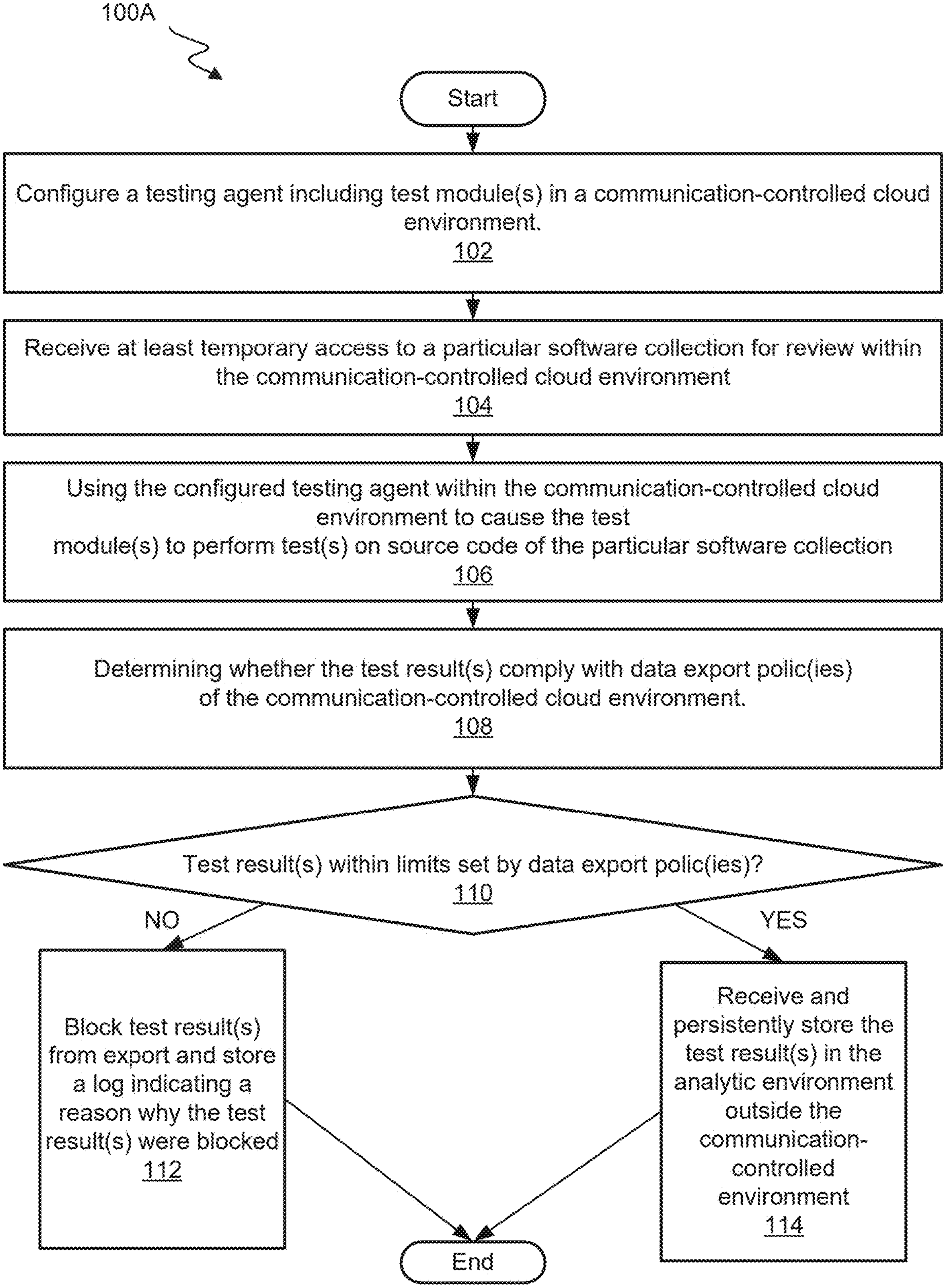
FIG. 1A illustrates a flow chart depicting a workflow of an example process for synchronously analyzing code and persisting test results for asynchronous analysis.

In some embodiments, test modules in a communication-controlled cloud environment run tests on private data and export test results to an analytic environment subject to data export policies. An analytic application is used to asynchronously analyze the test results in the analytic environment. Alternatively or additionally, in some embodiments, investigation-bound cloud environments are deployed in restricted subnets and accessed with remote access credentials for testing the collection of software. Information about the investigation-bound cloud environment displayed in the analytic application, and the investigation-bound cloud environment and the restricted subnet are forcibly deleted when the investigation is complete. In various embodiments, the cloud architectures for controlling, using, and analyzing isolated environments are implemented using non-transitory computer-readable storage media to store instructions which, when executed by one or more processors of one or more computer systems, cause the one or more computer systems to perform actions, store information, or display information.

A description of the cloud architectures for controlling, using, and analyzing isolated environments are provided in the following sections:

MULTI-PARTY CODE REVIEW TO PROMOTE PRIVACY AND SECURITY WITHOUT MUTUAL TRUST

SOURCE-CODE TESTING AGENT WITHIN A COMMUNICATION-CONTROLLED CLOUD ENVIRONMENT

EXPORTING TEST RESULTS SUBJECT TO DATA EXPORT POLICIES

ANALYZING THE TEST RESULTS IN AN ANALYTIC ENVIRONMENT

INVESTIGATION-BOUND CLOUD ENVIRONMENTS AND RESTRICTED SUBNETS.

RE-CONFIGURING THE TESTING AGENT BASED ON THE ANALYSIS

COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Multi-Party Code Review to Promote Privacy and Security without Mutual Trust

Cloud computing entities such as software companies and other companies offering goods or services in cloud computing environment(s) may cooperate to achieve greater results and strive to higher potential for innovation, revenue, and customer well-being. Despite the potential for greater good, cooperation among cloud entities also carries a risk of data compromise and a spread of the impacts of malicious code. Different cloud computing entities may have unidirectional or bidirectional suspicions of compromised code. For example, a first cloud entity may be suspicious that a second cloud entity's code is maliciously configured so as to circumvent a requirement or regulations (e.g., so as leak user data and/or present content in a manner that tricks users or otherwise compromises company or user data). The second cloud entity may have a competing concern, that the source code will be used and/or leaked by the first cloud entity in an unauthorized manner. In a situation where the second cloud entity's code may be malicious, for any projects involving collaboration among the cloud entities, the first cloud entity may not be able to ensure that original code or code updates comply with standards, requirements or regulations in a manner where code (e.g., original code or code updates) can be pushed in a timely manner. The situation becomes more problematic if data compromise has been more common with the second cloud entity and/or if the second cloud entity has not authorized full code review.

If a cloud entity has requested computing resources for processing, the cloud entity expects to be able to access (and maintain access to) data that is being processed and results generated via the processing. Data originating cloud entities may own or manage data (e.g., source code, a binary source file, raw data, or first-entity-generated results) for which the cloud entity wants to ensure that access is restricted. While the data originating entity may request and/or approve of select processing of the data, for example, as an input to a privacy or security review process, the data originating entity may want to ensure that long-term access to availed input data is tightly constrained.

Meanwhile, data reviewing cloud entities may be tasked with reviewing the data to ensure compliance with policies and laws and to promote safety of any collaborative projects. The data reviewing cloud entities may want to ensure that sufficient time is provided to analyze not only individual builds/versions/updates, but to also assess whether there are underlying patterns of potential concern. Similarly, an assessment of any given input data set may change as a context evolves (e.g., browser versions, device, updates, etc.).

To address these and other concerns, a cloud architecture may be configured for the data originating cloud entity and/or the data reviewing cloud entity to synchronously assess the source code (in human-readable or binary form) or other private data in a controlled manner that does not result in an export of the source code or other private data. The cloud architecture may also be configured for the data originating cloud entity and/or the data reviewing cloud entity to asynchronously assess metadata about the source code (in human-readable or binary form) or other private data in a controlled manner that does not necessarily require an export of the source code or other private data. The data originating cloud entity may want to ensure that a result of such assessment is limited in terms of the result's content and the result's reach. Such limitations may include time constraints, which mean that the data reviewing cloud entity may end up not having access to the source code (in human-readable or binary form) after the source code is deployed (and logs begin indicating the effects of deployment), or otherwise to the private data once the private data has cleared synchronous review. The data reviewing cloud entity may prioritize outputting results of an assessment for asynchronous analysis (given the time and resource constraints of synchronous analysis), and the data originating cloud entity may prioritize limited access to the private data. The synchronous and/or asynchronous analyses may be updated to accommodate new browser versions, new devices, software updates, or any other updates that may change the effects of implementation of the originating cloud entity's code or other private data.

As described herein, synchronous analysis is any analysis that is in a responsive operational pipeline that is triggered by an indication that a new private data file is accessible for testing or direct analysis, and asynchronous analysis is any analysis that is not necessarily in the responsive operational pipeline triggered by the indication that the new private data file is accessible for testing or direct analysis but may instead be performed later or on a different timeline, and optionally without access to the new private data file.

One potential use case for resource-constrained synchronous and data-constrained asynchronous analyses is to facilitate detecting malicious code in original code or updated code that is loaded to a cloud-computing system. Such detection may occur using a process that assures the data-originating cloud entity that their code/binary is protected. Beyond performing code review without exporting the code, another potential use case for the architecture pairing synchronous and limited asynchronous analyses is to allow an entity (e.g., associated with a university, employer, etc.) to review confidential information (e.g., of potential student applications, potential employee applications, current employee performance reviews, financial-report data, etc.) in a manner that retains data about the review process but that eliminates storing of or access to PII. As yet another example, data may be processed to predict whether the content has been plagiarized and/or was generated using a generative-AI tool. In various other examples, the data may be processed to detect harmful content, keywords, evidence of policy violations, evidence of discrimination, evidence of fraud, discovery documents, different uses of AI, and other information that is determined based on rules applied to the private data.

In one embodiment, the analysis may use modules that look for malicious or otherwise compromised code, harmful content, keywords, evidence of plagiarism, payment card industry evidence of fraud, discovery documents, word counts, lists of unique words, error codes, AI-generated content, calculations based on content, or other information that is not related to software but instead related to private, confidential, and/or otherwise separated files that exist in a tenancy. The modules may operate according to rules and may be tested and inspected by either party to determine whether the results produced by the modules are acceptable or within limits of data export policies of the data originating entity. Analysis of the information by the modules may generate test results that are exported to an analytic environment for further analysis by the data reviewing entity and/or the data originating entity.

The test modules may perform a variety of functions, some of which may be security related and/or others of which may not be security-related. Various examples are described herein with respect to a specific process for reviewing source code to guard against malicious code. The computer architecture to support these various examples may additionally or alternatively be applied to the additional use cases above, with tests being applied on non-code private data to produce results synchronously with production of the private data, combined with asynchronous analysis of the results in an environment external to the data originating cloud entity's cloud environment or any other environment that has direct access to the private data. Example test module functionality is described in more detail in the section entitled, "Source-Code Testing Agent Within A Communication-Controlled Cloud Environment."

Source-Code Testing Agent within a Communication-Controlled Cloud Environment

In one embodiment, test modules are deployed in a communication-controlled cloud environment, such as one with access to private data from the originating cloud entity, to perform tests on private data accessible in the environment and to export results of the tests to an analytic environment that is accessible to the reviewing cloud entity. Objects and other private data accessible in the environment may be prevented from being sent to the analytic environment or any other environment controlled by the reviewing cloud entity. In one embodiment, a gateway controls communications coming into and/or going out of the communication-controlled cloud environment, and the gateway limits an amount and/or type of data that can be exported from the communication-controlled cloud environment to the analytic environment or any other environment that persists in control of the reviewing cloud entity. The limits may ensure that the objects, such as source code, remain private and confidential to the originating cloud entity while still allowing the reviewing cloud entity to perform a combination of synchronous assessments of the objects via the test modules, as well as asynchronous assessments of results that describe characteristics of the objects via the analytic application.

In one embodiment, a multi-entity cloud-based approach provides constrained data access and supports a reviewing cloud entity such as a cloud-computing service provider to perform synchronous analysis on the input data within a communication-controlled cloud environment and asynchronous analysis on test data in an analytic environment. Select results and/or portions of the input object data may be availed to the reviewing cloud entity to perform asynchronous analysis. Such asynchronous analysis may facilitate determining how various code, files, data, etc. is changing over time. Constraints are imposed for the communication-controlled cloud environment specifying the amount and content of data that is output for the asynchronous analysis to reduce a likelihood that the asynchronous analysis may uncover code elements that are not authorized by the originating cloud entity for asynchronous review by the reviewing cloud entity.

When performing synchronous review of the originating cloud entity's objects, an agent in a communication-controlled or safe room type of environment may use test modules with limited time, limited resources, and/or limited communication capabilities. Test modules may run within the communication-controlled environment to make observations about characteristics of the objects, and the characteristics may be summarized as test results. The test results may be exported from the communication-controlled environment before the environment is deleted or deactivated once testing is complete or as test results are generated and optionally batched, and the test results may be limited by rules in the test modules themselves and/or by a gateway that controls communication from the communication-controlled environment. In one embodiment, whether testing and processing is completed or not, and whether test results have been successfully exported or not for later asynchronous review, the communication-controlled environment may be deleted or deactivated after a time limit has expired, with the objects and all references to the objects deleted. In another embodiment, whether testing and processing is completed or not, and whether test results have been successfully exported or not for later asynchronous review, direct access to the private data under review may be disabled for the communication-controlled environment after the time limit has expired for reviewing that private data.

FIG. 1A shows an example process for synchronously analyzing code and persisting test results for asynchronous analysis. As shown, the synchronous review process may begin in block 102 by configuring a testing agent that includes test module(s). The testing agent may be loaded into the communication-controlled cloud environment as a default testing agent to use for synchronously reviewing new code reported from the communication-controlled cloud environment. The test module(s) of the testing agent may be configured to access and analyze source code of software collections at least temporarily accessible from the communication-controlled cloud environment subject to data export polic(ies) of the communication-controlled cloud environment.

The process of synchronous review continues in block 104, where the test modules receive at least temporary access to a particular software collection for review in the communication-controlled environment. In block 106, the configured testing agent is used within the communication-controlled cloud environment to cause the test module(s) to perform test(s) on source code of the particular software collection.

Figure 2A:
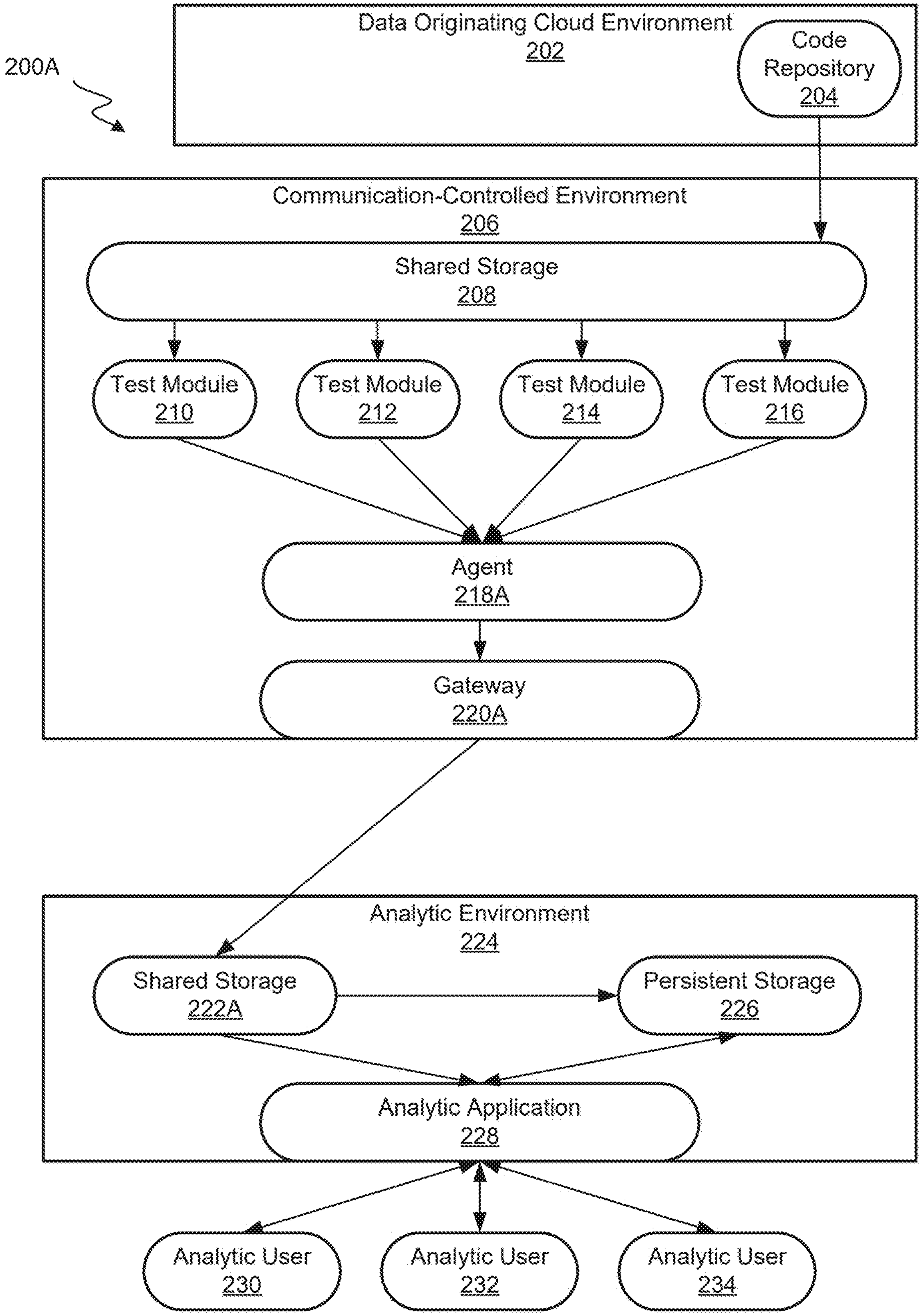
FIGS. 2A, 2B, 2C, and 2D illustrate diagrams of example cloud architecture for synchronously analyzing code and persisting test results for asynchronous analysis.
Figure 2B:
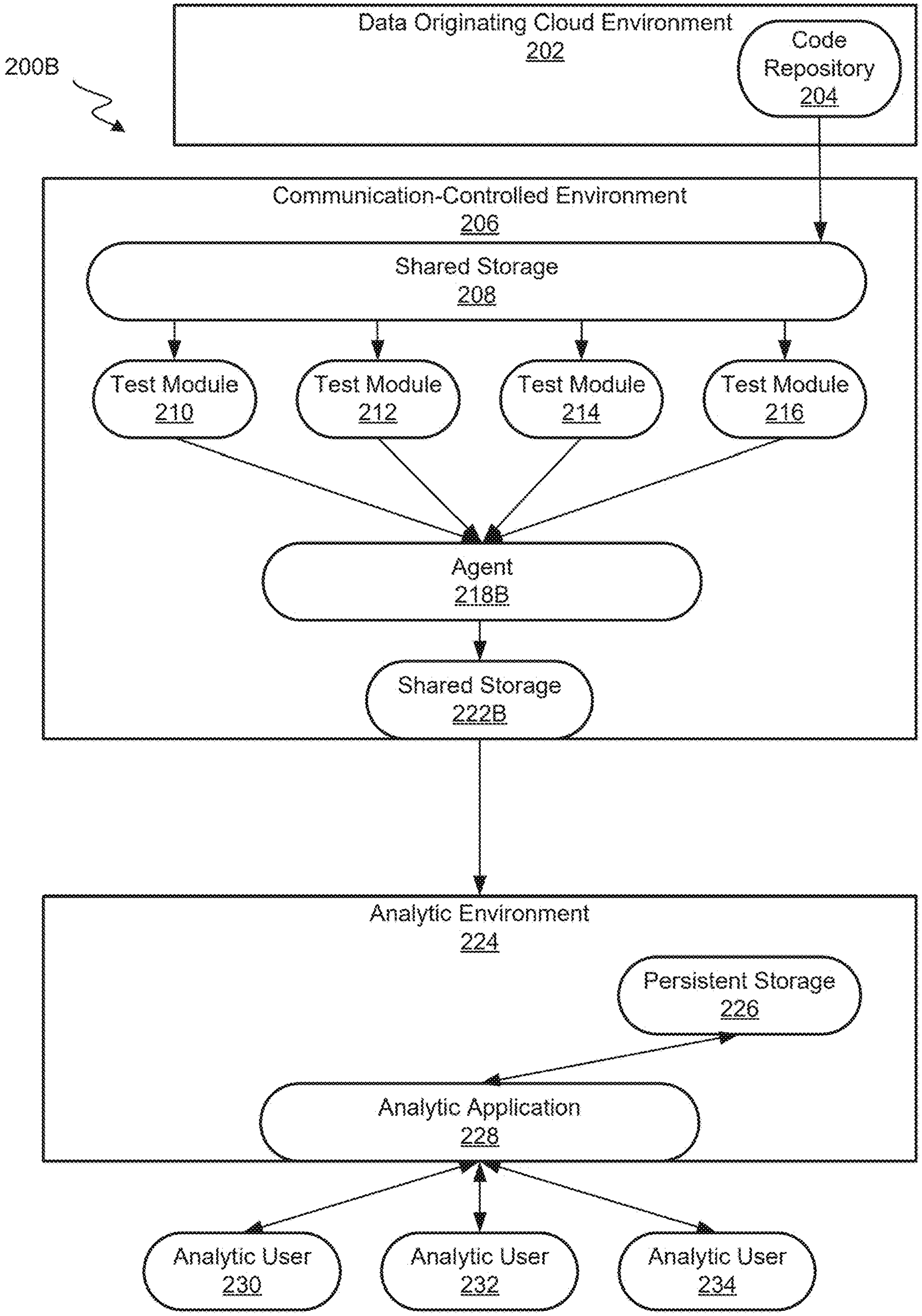
Figure 2C:
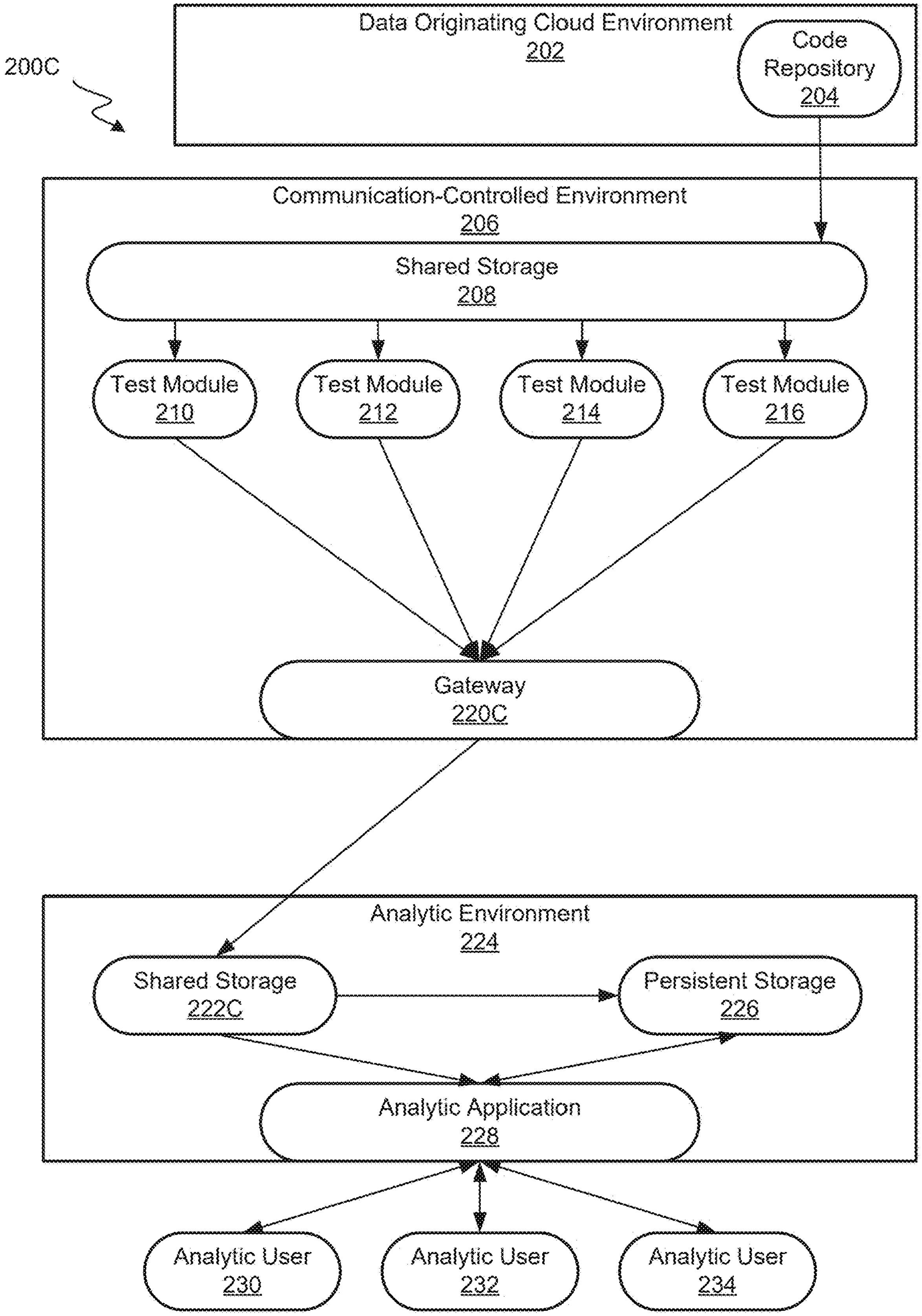

FIGS. 2A, 2B, and 2C illustrate diagrams of example cloud architectures 200A, 200B, and 200C, respectively, for synchronously analyzing code and persisting test results for asynchronous analysis. As shown, data originating cloud environment 202 includes code repository 204 or other private data repository that is shared into shared storage 208 of communication-controlled cloud environment 206 or otherwise provided to communication-controlled cloud environment 206.

Periodically, based on a development or production pipeline of an originating cloud entity, or as new files are generated or updated in the originating cloud entity's cloud environment, the testing agent may receive at least temporary access to a particular software collection for review within the communication-controlled cloud environment. For example, such review may be to analyze the code for malware prior to storage or integration into a production environment. The testing agent may not provide or pass along the software collection access to the analytic environment outside the communication-controlled cloud environment, but the testing agent may operate as previously configured within the communication-controlled cloud environment to cause the test module(s) to perform test(s) on source code of the particular software collection at least temporarily accessible for review within the communication-controlled cloud environment. The test(s) generate code test result(s) that depend on the source code of the particular software collection as analyzed by the test(s).

In one embodiment, a cloud infrastructure includes an external tenancy for sensitive source code analysis. The external tenancy shares a compartment for object storage that can be dropped into any other tenancy such as a tenancy where the source code exists. The external tenancy may include worker nodes such as Kubernetes worker nodes with test modules configured for performing analysis against the compartment and extracting data from the external tenancy into the analytic environment for asynchronous analysis. The data may be passed back into an application control plane on which the analytic environment is based.

The test modules can be added or removed from the communication-controlled environment in a modular framework that provides control over test module code that is to be run on newly detected objects without providing access to the newly detected objects themselves. Newly added test modules perform tests synchronously on an object when the object becomes available, subject to the communication controls of the communication-controlled cloud environment. The modularity of the test modules allows users of the analytic application to add modules to the set of modules running in the communication-controlled cloud environment. Proposed modules from the analytic environment may be submitted for approval by an administrator of the communication-controlled cloud environment to ensure that the proposed modules have been checked and tested to export only that data which is allowed for export by the communication-controlled cloud environment, and with further limits placed on the module individually or on the set of active modules as a whole by a gateway of the communication-controlled cloud environment. Each separate tenancy or separate communication-controlled cloud environment may have different modules or combinations of modules that have been approved or selected for use within the communication-controlled cloud environment, with other modules being blocked from use within the communication-controlled cloud environment until such other modules have been approved.

The test modules may produce data for output as a result of one or more tests performed on the objects. The test results may get passed to an agent internal to the communication-controlled cloud environment. The agent's outgoing data filter may provide a first level of protection on what data gets sent to the gateway. The agent may filter the data based on a variety of criteria, and the agent's data gets passed to the gateway to provide a second level of protection on what gets sent out of the communication-controlled cloud environment. Example communication controls imposed by the agent and/or gateway are described in more detail in the section entitled, "Exporting Test Results Subject To Data Export Policies."

The agent and metadata may pass along test results in the form of notes or metadata about the objects tested in the communication-controlled environment. The tests may be to look for patterns that show an intent to interfere with or abuse cloud operations or other indicators of compromise, such as hash IDs of malware or patterns present in malware, that are in the private data accessible to the communication-controlled environment. Certain characteristics detected in the communication-controlled environment may get reported externally for review asynchronously.

The modules may report to an agent running in the communication-controlled cloud environment, for example, in a Kubernetes cluster, and the agent may determine whether or not to attempt to export the test results based on data export policies of the communication-controlled cloud environment. The data or test results produced by the modules may be assembled by the agent for exporting into an object storage of an external tenancy. An analytic application may run a background process that consumes the object storage and makes the information available in a user interface in an analytic environment.

Figure 2D:
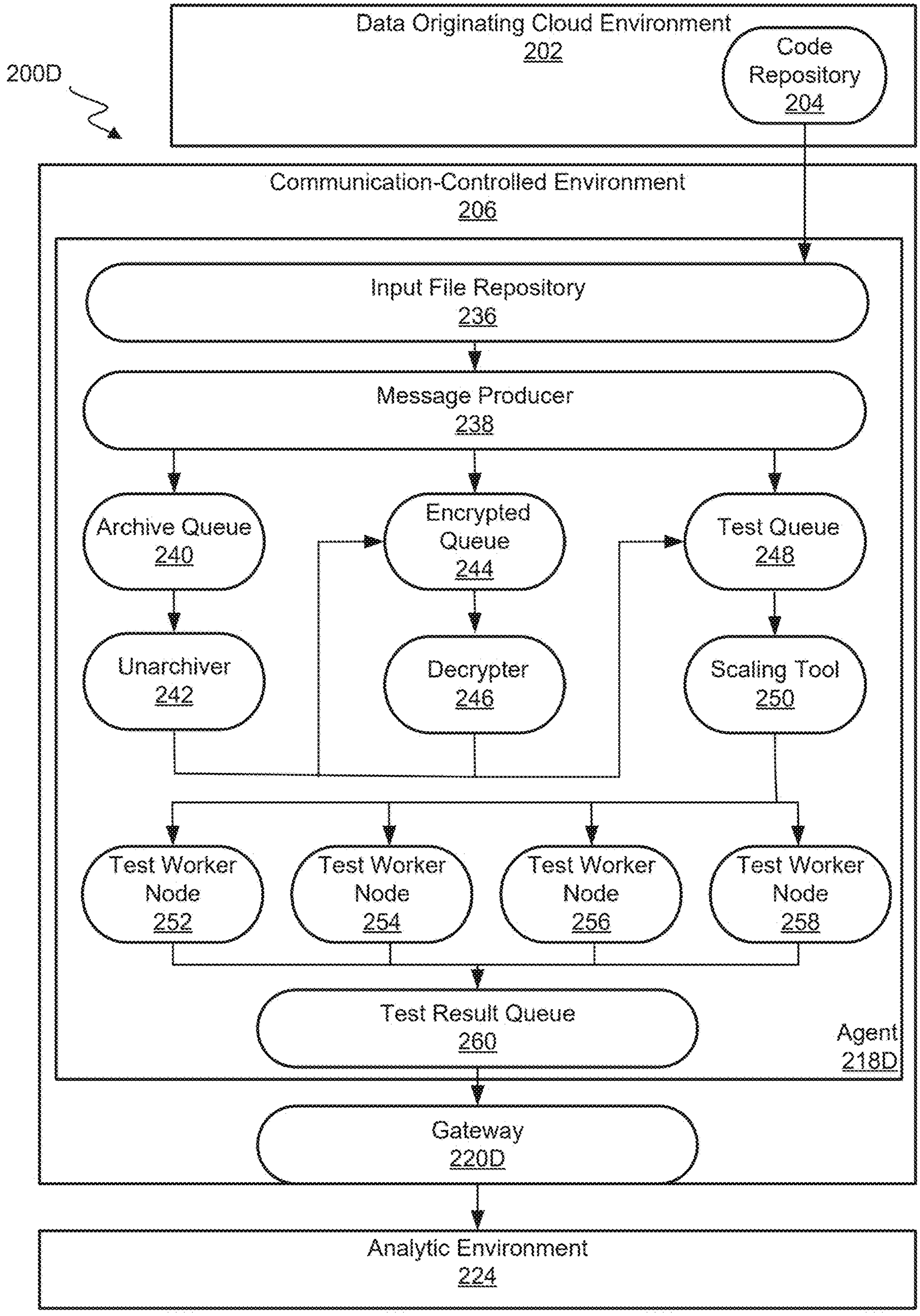

FIG. 2D illustrates a diagram of an example cloud architecture 200D for synchronously analyzing code and persisting test results for asynchronous analysis. As shown, data originating cloud environment 202 includes code repository 204 or other private repository, of which some code or other private data may be shared with an input bucket such as input file repository 236 of agent 218D of communication-controlled environment 206. Message producer 238 may process new, updated, or modified files from input file repository 236, for example, relating to software newly accessible to the communication-controlled cloud environment. Message producer 238, such as a cloud infrastructure event manager managing the input file repository 236, may triggers an event notification that an object has been placed in the bucket. The message may identify which file has been added or modified, for example, a name of the file, a location of the file, and/or other file metadata. The file may be accessible to the agent and test modules at this point, via shared credentials or direct access privileges.

An API gateway periodically queries the queue to determine whether or not there are any new messages in the queue. If there are messages on the queue, the API gateway receives a number of messages on the queue. The agent may also unzip, unarchive, unencrypt, and/or access a file using a password as a preprocessing part of the analysis, where the analysis may investigate the file as unzipped, unarchived, unencrypted, and/or otherwise accessed. For example, a message may be added to a specific queue based on the file described by the message. Messages describing archived files may be added to an archive queue 240 for consumption by an unarchiver that unpacks objects in the file from a compressed archived format of the file. Messages describing encrypted files may be added to encrypted queue 244 for consumption by decrypter 246 that decrypts the files based on known encryption keys. The API gateway coordinates with a scaling tool to scale a number of workers to handle the messages on the queue. Messages describing unencrypted and unarchived files may enter test queue 248, where scaling tool 250 scales up test worker nodes 252, 254, 256, and 258 to perform tests on the files, with a number of worker nodes based on how many files are in the queue and/or sizes of the files.

The scaling tool may use a Kubernetes virtual node cluster to spin up test worker nodes 252, 254, 256, and 258 to ingest messages off test queue 248 based on the metadata of the message. The worker nodes 252, 254, 256, and 258 analyze the file(s) using one or multiple test modules, and write one or more test results back to a test results file as a result of the analysis. Multiple test modules may run on one or multiple worker nodes. The Kubernetes virtual node cluster accommodates bursty file review, such that many worker nodes may be assigned to analyze large volumes of file content when available and few to no worker nodes may be active when there are no files to review.

Test worker nodes 252, 254, 256, and 258 generate test results, which are temporarily stored in test result queue 260 for output to analytic environment 224. Gateway 220D may analyze the contents of test result queue 260 to ensure that test result queue 260 complies with data export polic(ies) of communication-controlled cloud environment 206.

In one embodiment, the modules receive a software bill of materials (SBOM) and use the SBOM to access the object of software. The SBOM may include a list of files, for example, zipped together, to be processed by test modules. The test modules may provide a synchronous summary of the SBOM and persist test results in the analytic environment for asynchronous review. For example, the summary may indicate which files were analyzed and accessed successfully, which files were not accessible, which files are predicted to have negative privacy, security, or other impacts, or other indicators of compromise, and which files are okay. The summary may also indicate which user pushed or committed the SBOM, and whether the SBOM was ever used as active software in a production environment.

The file or object may be accessed via object storage. In one embodiment, an object storage of a communication-controlled cloud environment may be accessed by an agent outside of the communication-controlled cloud environment for processing by testing modules through a cross-tenancy authorization. The message queue may provide a list of files and a manner of accessing the files from the object storage so the test modules can run tests against the objects without exporting the objects to the analytic environment. The message queue may provide limited access to files for analytic purposes, and the test modules may be prevented from exporting the files from the communication-controlled cloud environment. The test modules may perform tests on the files and instead export test results that are targeted observations about the files.

In another embodiment, objects may be sent to the agent outside the communication-controlled cloud environment from an agent within the communication-controlled cloud environment. The agent outside the communication-controlled cloud environment may store the objects in a manner that may or may not be accessible to an analytic environment. The objects may be processed by testing modules, and a test result may be made available or accessible to the analytic environment in a persistent manner.

In another embodiment, the object storage of an analytic environment may be accessed by an agent within the communication-controlled cloud environment for posting test results of the testing modules through a cross-tenancy authorization. The results of the testing modules may be assembled and posted to the object storage, which may be accessible or made accessible to the analytic environment.

In yet another embodiment, the agent and analytic environment may be co-located in the same tenancy, reporting on an access-restricted portion of data storing software in the tenancy. The agent may process, using testing modules, a portion of the data that may not be accessible to the analytic environment and make the test results available to the analytic environment persistently for review.

In one embodiment, the test results and other analytic information may be stored in a repository that is accessible via a command-line interface for further analysis. In another embodiment, the test results and other analytic information may be stored in a repository that is accessible via a graphical user interface for analyzing the test results and other analytic information.

The test modules may perform static analysis on the files in a manner that does not endanger the communication-controlled cloud environment if malware is present. The static analysis may inspect contents of the files based on rules to determine metadata that describes the contents or indicates whether the contents are predicted to have negative privacy, security, or other impacts, or are predicted to be okay. The static analysis does not run code under review but instead inspects the code under review based on known patterns.

In another embodiment, the test modules may alternatively or additionally perform dynamic analysis within an investigation-bound and potentially network-limited environment that can be controlled by the test module and/or the analytic application for running executable code and determining whether malicious behavior occurs without exposing the malicious code to the communication-controlled cloud environment. Example environments for dynamic analysis are described in more detail in the section entitled, "Investigation-Bound Cloud Environments And Restricted Subnets."

In one embodiment, different modules are deployed in different tenancies, with the modules reporting back test results to the analytic environment that is outside of the different tenancies. The test results may be analyzed in the analytic environment to keep track of security issues, privacy issues, data integrity issues, or other issues in the different tenancies, with the original documents from which the test results are derived remaining in the different tenancies without being exported.

Various example test modules may report on any combination of one or more of the following:

- a hash (e.g., MD5, SHA1, SHA256, SHA512, SSDeep) of a file or a portion thereof, and/or
- a file size or a size of a portion of the file, and/or
- a line count, and/or
- a file entropy, line entropy, entropy of a portion of the file, or other entropy calculation, and/or
- file attributes, and/or
- strings or obfuscated string in the file or a portion of the file, and/or
- malware signatures detected in a file or a portion of the file, and/or
- IP addresses and/or domain names used in the file or a portion of the file, and/or
- characters or sections of the file that are in different languages, and/or
- function calls made in the file or a portion of the file, and/or
- Base32/64 detection for the file, and/or
- Android XML file permissions information, and/or
- PE and ELF file attributes, and/or
- inline ASM detected in the file or a portion of the file, and/or
- Detect It Easy (DIE) indications, and/or
- a timestamp the file was last seen by the test modules, and/or number of times the file was seen by the test module, and/or Any other information other than the full source code that is compliant with the data export polic(ies) in place and potentially helpful for detecting indications of compromise in the code.

In one example, one or more of the test modules test for characteristics of the files as a whole, such as a hash of a file to get the file's MD5 hash signature. These characteristics may be used to detect malicious files based on known signatures. In one embodiment, the test results may indicate that a hash of a file matches a hash of known malware. In this embodiment, the agent in the communication-controlled cloud environment may send a notification that the malware has been detected in the communication-controlled cloud environment, optionally out-of-band with other test results, and optionally without regard to the controls of the communication-controlled cloud environment, based on an agreement between the originating cloud entity and the reviewing cloud entity that detection of known malware files as a whole, as opposed to files showing less certain indicators of compromise, should be treated in a separate pathway.

In another example, the test results may indicate file sizes, number of lines, or contents, such as those that are within or beyond normal ranges of files sizes or number of lines, or those that that have changed over time (e.g., a 100-line file changes to a 2-line file that may be analyzed), and the test results may be analyzed asynchronously in the analytic environment to determine whether the file size information is suspicious, malicious, unknown, okay, low priority, medium priority, and/or high priority. The test modules may additionally perform further tests on files beyond normal ranges or files known to have changed significantly based on a comparison to past file sizes. These further tests may include, for example, checking the files for the presence of certain keywords or patterns that were not initially checked. In some embodiments, the communication-controlled cloud environment has data export policies in place to prevent an export of the file itself and/or of specific lines of the file, but the communication-controlled cloud environment may allow export of a derivative analysis of the file. The exported analysis may be further analyzed asynchronously for patterns or evidence of suspicious or malicious content.

In another example, the tests may evaluate an entropy of a file or a section thereof. For example, the file or section of the file may be evaluated using a Shannon entropy or other entropy calculation of the content, indicating how much independent information is contained in the file or section. Such tests may reveal secrets, passwords, or other high entropy data embedded in code, potentially leading to security vulnerabilities in the code. The entropy of code or individual lines of the code may be reported, estimated, and/or summarized in output test results. Additional details about calculating entropy for a set of code and using the entropy to detect potential security vulnerabilities are provided in U.S. patent application Ser. No. 18/595,039, entitled "Targeting Code Analysis on Unpredictable Sections of Text," by Taleb Hashemi Kamran, filed on Mar. 4, 2024, the entire contents of which is incorporated by reference herein.

In another example, one or more of the test modules test for characteristics of content present in the files such as lists of alphabetical characters or unique words present in the file. The test results may not export a copy of the file under analysis, but attributes of the file may be summarized in a compact form that results from evaluating contents of the file using rules or functions to extract information relevant to privacy or security review or other asynchronous review.

By searching for strings, hashes of or obfuscated strings, or hashes of or obfuscated files, test modules may detect known malware signatures in the files and report the known malware signatures as part of the test results. Example tools such as ClamAV and Yara may identify existing malware signatures and combinations of file characteristics and a relative risk associated with the existing signatures and combinations of file characteristics for use in testing files for whether the existing signatures are present. An identity of the risk detected and the corresponding risk of the identified risk may be reported in the test results.

The searches may also identify IP addresses and/or domain names that are present in the file or a portion of the file. The test modules may maintain a list of blacklisted IP addresses and/or domain names and/or whitelisted IP addresses and domain names. The blacklisted IP addresses and/or domain names may be associated with malware or may otherwise indicate compromised code or increased risk of compromised code. In one embodiment, the blacklisted IP addresses and/or domain names are reported in, and the whitelisted IP addresses and/or domain names are excluded from the test results.

In one example, one or more of the test modules test for non-English words in general, such as Chinese or Japanese characters, or specific non-English words, such as words associated with malware or security vulnerabilities. Characteristics of code sections or snippets around the non-English words may be exported as test results for review. Such non-English words or characters may be harmless or may include secrets embedded in the code, potentially leading to security vulnerabilities.

In another example, the test results test use of or compatibility with certain functionality, function calls, interfaces by the code, or other indication of functionality in the code. The analytic application may include an interface that shows test results for the code as well as a description of the functionality that the code has been mapped to, based on the indication of functionality. The description of functionality may be refined in the interface and detected in other sets of code that interact with the same function, interface, or other functional component. The functionality may also describe operations performed by the code, such as addition, subtraction, multiplication, division, duplication, or other code patterns detectable from code analysis and testing, and these code patterns may be labeled for the code as information about the code is shown in the interface of the analytic application.

The test modules may search for incompatible or inconsistent use of encoding schemes for a file or collection of files. For example, Base64 encoding may be used to reduce the likelihood of compromised data being detected, as Base64 encoding is less easily read by a human than Base32 encoding. If a collection of files includes inconsistent use of Base32 and Base64 encodings, such an inconsistency may be reported in the test results and used in asynchronous analysis of other test results from the file.

In another example, the test modules analyze Android XML file permissions information for files used by or accessed by the code or action permissions information for actions taken by the code. The test modules may report, in test results, occurrences where the code accesses files that are restricted and/or takes actions that are restricted. For example, the code may repeatedly access restricted files well after file permissions have been granted, and such behavior may be unexpected based on functionality being provided by the code. Such information in the test results may be used in asynchronous analysis to investigate whether the code is compromised.

In another example, the test modules search for Portable Executable (PE) and Executable and Linkable Format (ELF) ELF file attributes in the files. These file attributes are often used by malware attempting to take control of a machine, and these file attributes may signal compromised code that should be analyzed in asynchronous analysis to determine why such file attributes are in use or available for use.

Inline assembly language instructions (inline ASM) may be embedded in other code, such as C code. This inline ASM may be used by malware attempting to expand control beyond boundaries implemented by the containing code, and the use of inline ASM instructions may signal compromised code that should be analyzed in asynchronous analysis to determine why inline ASM is in use rather than code executed within the native language.

Detect It Easy (DIE) is a tool for determining file types. In one example, DIE indications may be used to determine that code or an object labeled as one file type, such as a video file, actually contains a different file type, such as an executable. The DIE indications of inconsistent file type usage may signal compromised code that should be analyzed in asynchronous analysis to determine why such file type inconsistencies are present in the code or private data.

Some modules may be dependent on or be used only for certain types of files or file contents and not for other types of files or file contents. For example, some modules may operate on certain code languages and not other code languages. Some modules may be able to parse Java, C++, C, and Python, but not Ruby, for example. As such, certain modules may be triggered or used only if one or more conditions are met by the type of file or type of contents in the file.

In an embodiment, files that were unable to be reviewed by one or more existing modules may be analyzed dynamically in an investigation-bound environment. The investigation-bound environment may provide network and resource constraints or other sandbox restraints so the file can be opened and run to determine if there are any indicators of compromise during use of the file without compromising a larger cloud environment. The investigation-bound environment and corresponding resources may be automatically deleted after the investigation is completed.

In one embodiment, the one or more existing modules perform dynamic analysis by downloading content referenced as an external script and running the downloaded content in a resource-constrained environment such as a sandbox, optionally with simulated external resources involved rather than actual external resources in the real world. Same or different modules may perform static analysis by analyzing a link to the external script rather than downloading or running the content. The analytic application may allow users to look for other files that use the same or a similar link to the external script. If a dynamic analysis concludes the script is malicious, the static analysis may be used to flag all software packages that reference the malicious script. Examples of performing dynamic analysis are described in more detail in the section entitled, "Investigation-Bound Cloud Environments And Restricted Subnets."

Exporting Test Results Subject to Data Export Policies

Availing results and/or portions of the input object data for asynchronous analysis carries a risk that the reviewing cloud entity may use and/or store the results and/or input object data in a manner not authorized by the originating cloud entity. To mitigate the risk, a set of output constraints or data export policies may be implemented, which can be enforced by a gateway of the communication-controlled environment and/or by an agent managing the test modules. The output constraints ensure that test results but not original private data may be exported for review and further asynchronous analysis.

In various embodiments, the test modules review code for efficiency, compliance, or security, and, to facilitate this review, the code is temporarily accessible to a communication-controlled environment where test modules can test the code and with architecture in place to ensure that the code under review is not taken out of the communication-controlled environment, and in a manner that is logged to provide the originating cloud entity an ability to audit what information is being exported to the analytic environment. The test modules are allowed to do the analysis in real time, as the data becomes available, and the data exported to the analytic environment may be reviewed asynchronously at a later time as the exported data is persisted in the analytic environment.

The communication-controlled cloud environment may prevent access to code or exporting of code outside the communication-controlled cloud environment, and the test modules instead obtain test results within the communication-controlled cloud environment and report the test results outside the communication-controlled cloud environment without the code on which the test results were obtained.

Any number of modules can be used to detect and report on any aspect of the files included in or used by the software collection being monitored. Such modules may be created and imported into the communication-controlled cloud environment for reporting on limited aspects of files and code under analysis. Example test module functionality is described in more detail in the section entitled, "Source-Code Testing Agent Within A Communication-Controlled Cloud Environment."

On importing into the cloud-controlled environment, the modules may be inspected to ensure the modules do not attempt to export more data than what is allowed for the communication-controlled cloud environment. The modules may also be inspected in an ongoing manner by a gateway in the communication-controlled cloud environment. The gateway may ensure that the module does not export more data than what is allowed and that the data being exported is not encrypted prior to export and also is not source code. The non-encrypted data may be encrypted or uploaded to object storage in an encrypted tunneled session with the object storage by the gateway once the gateway has ensured that the modules are not attempting to export more than what is needed. The object storage may then be accessed by the analytic application, which may have credentials to access the object storage for asynchronous analytics.

Referring back to FIG. 1A, process 100A continues in block 108, where an agent or gateway determines whether the test result(s) comply with data export polic(ies) of the communication-controlled cloud environment. If the test result(s) are within limits set by the data export polic(ies), process 100A branches at block 110 to block 114, where the test result(s) are received and persistently stored in the analytic environment outside the communication-controlled environment. If the test result(s) are not within the limits set by the data export polic(ies), process 100A branches at block 110 to block 112, where the test result(s) are blocked from export, and a log is stored that indicates a reason why the test result(s) were blocked. For example, the log may indicate what limit(s) were exceeded by the test results, and the log may be shared with the data originating cloud entity and/or the data reviewing cloud entity.

Referring back to FIG. 2A, test modules 210, 212, 214, and 216 consume the private data in shared storage 208 to produce test results that pass to agent 218A and gateway 220A, which may provide a first pass and second pass filter to ensure that the data complies with data export policies of communication-controlled cloud environment 206. Gateway 220A may push the information into shared storage 222A, which is accessed by analytic application 228 and/or stored in persistent storage 226, for analysis by analytic users 230, 232, and/or 234.

In another embodiment shown in FIG. 2B, test modules 210, 212, 214, and 216 consume the private data in shared storage 208 to produce test results that pass to agent 218B, which may enforce data export policies of communication-controlled cloud environment 206 and store test results that comply with the policies in shared storage 222B. Shared storage 222B may be accessed by analytic environment 224, which may pull the information into analytic application 228 and/or persistent storage 226, for analysis by analytic users 230, 232, and/or 234.

In yet another embodiment shown in FIG. 2C, test modules 210, 212, 214, and 216 consume the private data in shared storage 208 to produce test results that pass to gateway 220C, which may filter the test results to ensure that the test results comply with data export policies of communication-controlled cloud environment 206. Gateway 220C may push the information into shared storage 222C, which is accessed by analytic application 228 and/or stored in persistent storage 226, for analysis by analytic users 230, 232, and/or 234.

The set of output constraints or data export policies may include, but is not limited to any one or a combination of the following limits:

- how much data (an absolute or relative quantity) is permitted to be output from the controlled cloud environment over a given period (e.g., minute, hour, or day) and/or overall, and/or
- a maximum size (absolute or relative) per file for output corresponding to specific files, and/or
- when (or how frequently) data is permitted to be output from the controlled cloud environment, and/or
- a type of data that is permitted to be output from the controlled cloud environment, and/or
- to which computing system(s) data is permitted to be output from the controlled cloud environment, and/or
- what filters can be in place for output data (e.g., to prevent personally identifiable information (PII) from being exported, to prevent executable code from being exported, and/or to prevent certain patterns of expressions from being exported), and/or
- data subject to a report or log of what data was output or metadata about the output data according to each of these categories.

The set of output constraints may be determined by the originating cloud entity and/or the reviewing cloud entity based on limits selected in an analysis restrictions interface of an analytic application. In one embodiment, constraints may be placed on the communication-controlled environment based on a policy set between the parties and implemented using the agent and/or gateway managing communications being sent from the communication-controlled environment. For example, the interface may show which constraints have been agreed-upon by both parties and which constraints have been requested to be imposed by the originating cloud entity but not yet agreed-upon by the reviewing cloud entity. In one embodiment, the test modules may begin operation when the originating cloud entity has agreed upon certain constraints even if the reviewing cloud entity has not yet agreed upon the certain constraints. The test results may be delivered to the analytic application accessible to the reviewing cloud entity, and the reviewing cloud entity may highlight certain records or scenarios to establish why some existing constraints should be relaxed or removed in order to best protect both cloud entities from potentially compromised code.

In one embodiment, all results coming out of the secure execution environment (SEE) pass through a gateway, and the gateway does checks before the data is allowed to proceed to the analytic environment. In one example, the gateway at the edge of the communication-controlled environment limits exports to 50-100 lines of code per day or per file, 50-100 MB of content per day or 1-2 MB of content per file. The limits may further depend on and vary for the type of data being exported. For example, different limits may be placed on encrypted data vs. unencrypted data that can be extracted from the communication-controlled environment in a day, week, or other export period. One reason for imposing tighter constraints on encrypted data is because encrypted data is not visible to the other party, even if the gateway can see the raw bits without knowing the decryption key. For example, the encrypted data may be limited to 1 MB per day, and the unencrypted data may be limited to 100 MB per day.

The limits depend on the policy set between the originating cloud entity and the reviewing cloud entity. Some policies may require all extracted data to be unencrypted, and some policies may allow some data to be encrypted in limited circumstances or quantities. For example, if a detection was made by one of the modules of a pattern indicating compromised code, the agreement may allow for a limited encrypted export.

The limits may also vary for different types of data being reported. Data formatted using known schemas with known data types, such as those schemas and data types associated with known tests, may have one limit, while free-form large objects, even if unencrypted, may have a different, smaller limit.

The limits may also vary depending on the target. For example, one target for third party non-partner auditing analysis may have a first limit, another target for partner auditing analysis may have a second limit, and a third target for internal auditing may have a third limit. In the example, internal auditing may have a higher limit due to the higher trust placed on internal resources over external resources.

The limits may also vary depending on filters for certain types of output data. The filters may catch personally identifiable information (PII) including social security numbers or phone numbers, executable code, and other patterns of expressions such as those that may be expressed and detected using regular expressions. The filters may completely excluded detected data of the certain type, or may allow a limited amount of data of the certain type to be exported per day, depending on the policies in place.

In one embodiment, the gateway checks the data to be exported for the presence of executable code and/or encrypted data. For example, in content to be exported, the gateway may distinguish between dictionary words and numbers and random collections of characters in order to determine that encrypted data is being exported. The content may also have known field values, such as values measuring timestamps, sizes, hashed outputs, etc., and the gateway and/or the object store may ensure that the exported field values have a format that is valid for the field being stored. As another example, the gateway may store common lines of code that occur within the communication-controlled cloud environment, and/or common regular expression patterns that are present in code that occurs within the communication-controlled cloud environment, and the gateway may check that the exported data does not contain any such content. Filter patterns may be added to the gateway for catching exported code based on asynchronous analysis within the analytic application by users of the communication-controlled cloud environment. If any violations of the policy are detected that were originally missed by the gateway, a matching pattern may be added to the gateway to prevent future data exports that would violate the policy. The exported content may also be removed from the analytic application, and/or the test module that produced the exported content in violation of the policy may be disabled or removed from the communication-controlled cloud environment, and control over the test module may be provided to users of the communication-controlled cloud environment from within the analytic application.

In one embodiment, if a high priority threat is detected in the communication-controlled cloud environment, a gateway of the communication-controlled cloud environment may allow a fixed number or size of notifications matching certain high priority threat criteria to be sent outside the communication-controlled cloud environment. Such communications may or may not be tunneled into the object store accessible to the analytic application. In one embodiment, such communications may also be sent via email or a Jira alert to members of an administration team for the communication-controlled cloud environment and/or to members of an administration team of the analytic environment. In this manner, the immediate high priority threat may be handled quickly and efficiently with direct communications that may be visible to the originating cloud entity and/or the reviewing cloud entity to mitigate the threat before the threat becomes more significant.

In one embodiment, the agent and/or the gateway logs data output by the test modules. The logs may be accessible to the originating cloud entity and/or the reviewing cloud entity to facilitate a discussion of why certain content was blocked or was exported by the agent and/or the gateway. The logs may be automatically maintained for the agent and/or the gateway to track output test result data, such that the log may be audited at any time. Alternatively, the logs may be kept for a threshold amount of time before the logs are deleted, to prevent misuse of the log data. The logs may be processed to indicate whether any portion of the logs matches any portion of the input data or any hash thereof. The data obtained about matching input data portions may be stored as metadata for the logs. For example, the metadata may indicate that two lines of code were included in the output test results over the past 24 hours. The output may match the log messages that track the output, and/or the log messages may include or summarize the output. In this manner, the output that summarizes the code may further be summarized by metadata that summarizes the output in an output log.

In addition to analyzing the outgoing communication synchronously in real-time by the gateway, the logs provide the data originating cloud entity with the ability to asynchronously audit whether the data reviewing cloud entity is encrypting any exported data with the test modules, or otherwise potentially exporting data that violates any data export polic(ies). Encrypted data can be detected, for example, if the data does not conform to data types and size limits expected for fields of data values that have been determined as acceptable output from the test modules. For example, test result data that is supposed to report a 256-bit value based on a code base may be flagged and blocked by the gateway synchronously and/or flagged in an asynchronous audit if the exported data exceeds 256 bits when reporting the value. As another example, test result data that is supposed to report a size of the code base may be flagged if the data does not report size information but instead seemingly random characters. As yet another example, test result data that is supposed to report unique words that appear in a code base may be flagged if the data reports non-words and/or words that do not appear in the code base. The logs, if preserved, facilitate a discussion over any potential policy violations by either party, for example, if data is being blocked that should not be blocked by the policy and/or if data is being exported or attempted to be exported that should not be exported under the policy.

In one embodiment, the input data may be available to the test modules for a fixed period or window of time. The fixed period or window of time may allow the test modules to perform operations to test the input data but prevents any long-term strategies for persisting the data piece by piece in test results and reconstructing the code based on the persisted data. In one embodiment, the originating cloud entity may initiate transmitting the input data to a location at least temporarily accessible to the agent for use by the test modules. The agent may confirm receipt and process the data by the test modules. The test modules may then export the test results to the analytic environment of the reviewing cloud entity automatically upon completion of the tests by the test modules. The test results may be stored in a location in the analytic environment that is accessible to an analytic application for asynchronous analysis. In one embodiment, a data-transmission deadline may be met by exporting the test results to the analytic environment within the fixed period or window of time. If such deadline is not met, the controlled cloud environment may automatically transmit the data upon detecting that the deadline has elapsed, and/or may delete the data and/or the test environment in which the data is being processed.

With tight controls on communication out of the communication-controlled environment, the reviewing cloud entity can accomplish review for potential malware without a risk to either cloud entity of the malware being exported out of the communication-controlled environment. The tight controls also allow an originating cloud entity to provide code for review and detection of potential malware without the risk that the code itself is exported out of the system or otherwise misappropriated by the reviewing cloud entity.

If the agent and the gateway determine that the test result(s) are within limits of the data export polic(ies), the data is exported to the analytic environment for review in the analytic application, for example, by the reviewing cloud entity. The test result(s) may be received in the analytic environment, for example, via shared storage or via a tunneled communication, and the test results may be persisted in the shared storage or in separate storage for reviewing and analysis in the analytic environment by analytic application, outside the communication-controlled environment.

Analyzing the Test Results in an Analytic Environment

In various embodiments, a reviewing cloud entity may review test results derived from an originating cloud entity's code without having direct access to the originating cloud entity's code and without risking export of potentially malicious code. If the reviewing cloud entity is a cloud services provider of application services, database services, storage services, processing services, and/or other cloud computing services, the reviewing cloud entity may coordinate with cloud customers, which may be data originating cloud entities, to assure the privacy and security of the code and data of the cloud customers while providing services for detecting compromised code. In these situations, synchronous access may provided to the cloud customer's code, but within a communication-controlled environment using testable and predictable modules, with data export polic(ies) and logs of exported data that ensures the cloud customer's code is not being copied and, depending on the polic(ies) and agreement in place, might not even be viewable by a human operator at the data reviewing cloud entity. The data reviewing cloud entity may detect issues in the code with the synchronous, module-driven, automated and potentially non-human-accessible portion of the data review pipeline, and the detected issues may be analyzed asynchronously based on test results gathered and reported during the asynchronous review. If additional keyword checks, file size checks, signature matches, or content-based metrics would be helpful in the asynchronous review, the data reviewing cloud entity may gather those additional metrics during the synchronous review by the testing modules for which results may be later viewed asynchronously.

The exports may be mutually accessible, for example, via the analytic application, such that the originating cloud entity may check that export policies are being complied with even if the gateway allows the traffic to exit, and such that the analytic application may consume the exported test results to provide out-of-band or asynchronous analysis for the reviewing cloud entity. In another embodiment, the exports are accessible by the reviewing cloud entity but not the originating cloud entity, and the source code or other private data before export is accessible by the originating cloud entity but not the reviewing cloud entity. The originating cloud entity may additionally have access to a log of data exported from the gateway of the communication-controlled environment. The log itself may be exported to a cloud environment of the originating cloud entity for asynchronous review, optionally using a different analytic application.

In one embodiment, the analytic environment is in a separate tenancy of a cloud infrastructure than the communication-controlled environment. A code analytic tool may run in a tenancy specific to an analytic team, which may be in a separate tenancy (and even have a separate company or owner) from a tenancy in which the code resides, is being tested, and/or from which test results are being exported. The code analytic tool may store information in a database, and the code may be accessible via an application. The application may provide a user interface for analyzing the test results and storing analysis results, including, for example, flagging code sources and/or test results as suspicious (warranting further investigation or testing), as malicious (determined to compromise privacy or security in the communication-controlled cloud environment or another cloud environment impacted by the code), as okay (known as not suspicious or malicious), as unknown, or as not yet reviewed. The code sources and/or test results may also be rated with tiered ratings such as low priority, medium priority, and/or high priority, which may correspond to low risk, medium risk, or high risk of malicious content, for example.

Figure 4A:
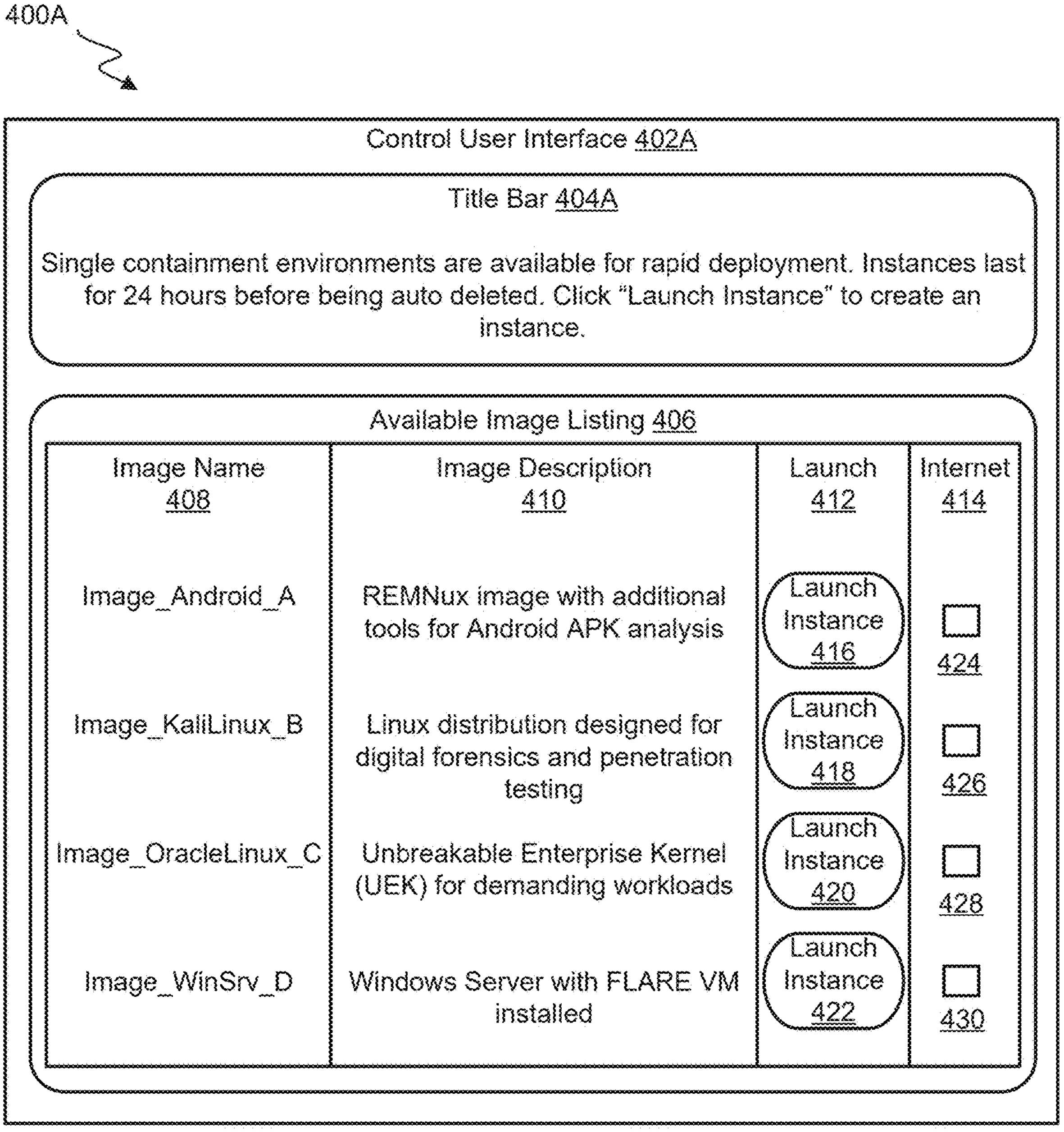
FIG. 4A illustrates an example user interface for rapidly launching an instance with a single selection.
Figure 4B:
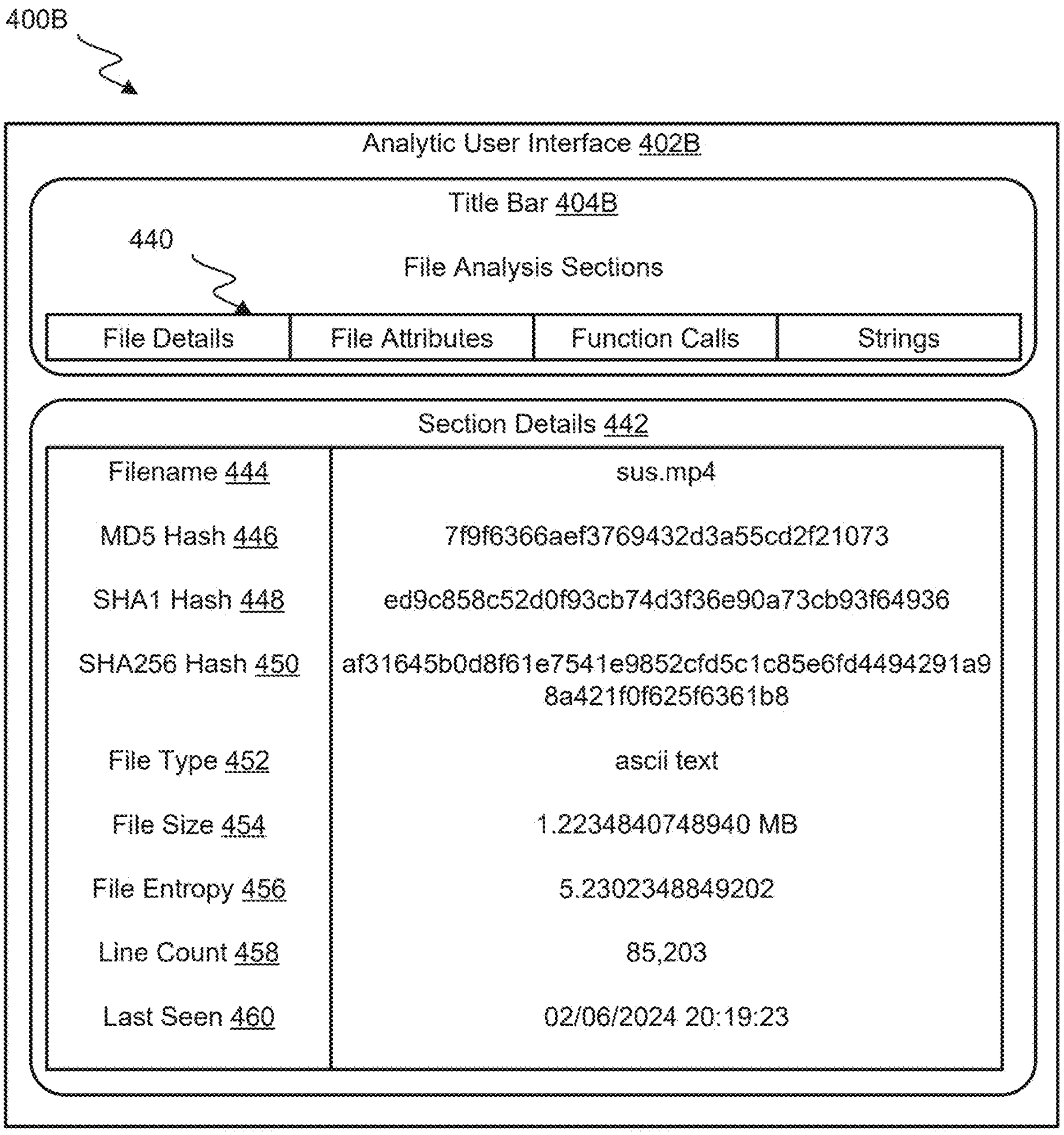
FIG. 4B illustrates an example user interface showing details about test results from different test modules.

FIG. 4B illustrates an example user interface 400B including an analytic user interface 402B that shows details about test results from different test modules. As shown, analytic user interface 402B includes title bar 404B, which explains that the page provides file analysis sections. Specific file analysis sections 440 are listed along the top and selectable to provide details about test results corresponding to the selected section. For example, file details is currently selected, and section details 442 includes file details information. Similarly, file attributes, function calls, strings, and any other section corresponding to any test result information may be selected to display information about the corresponding test results on the file. In section details 442, a variety of file details are provided, such as filename 444, MD5 hash 446, SHA1 hash 448, SHA256 hash 450, file type 452, file size 454, file entropy 456, line count 458, and last seen timestamp 460. In the example shown, the values for each of the file details are provided next to the corresponding file detail header 444, 446, 448, 450, 452, 454, 456, 458, and 460.

Figure 4C:
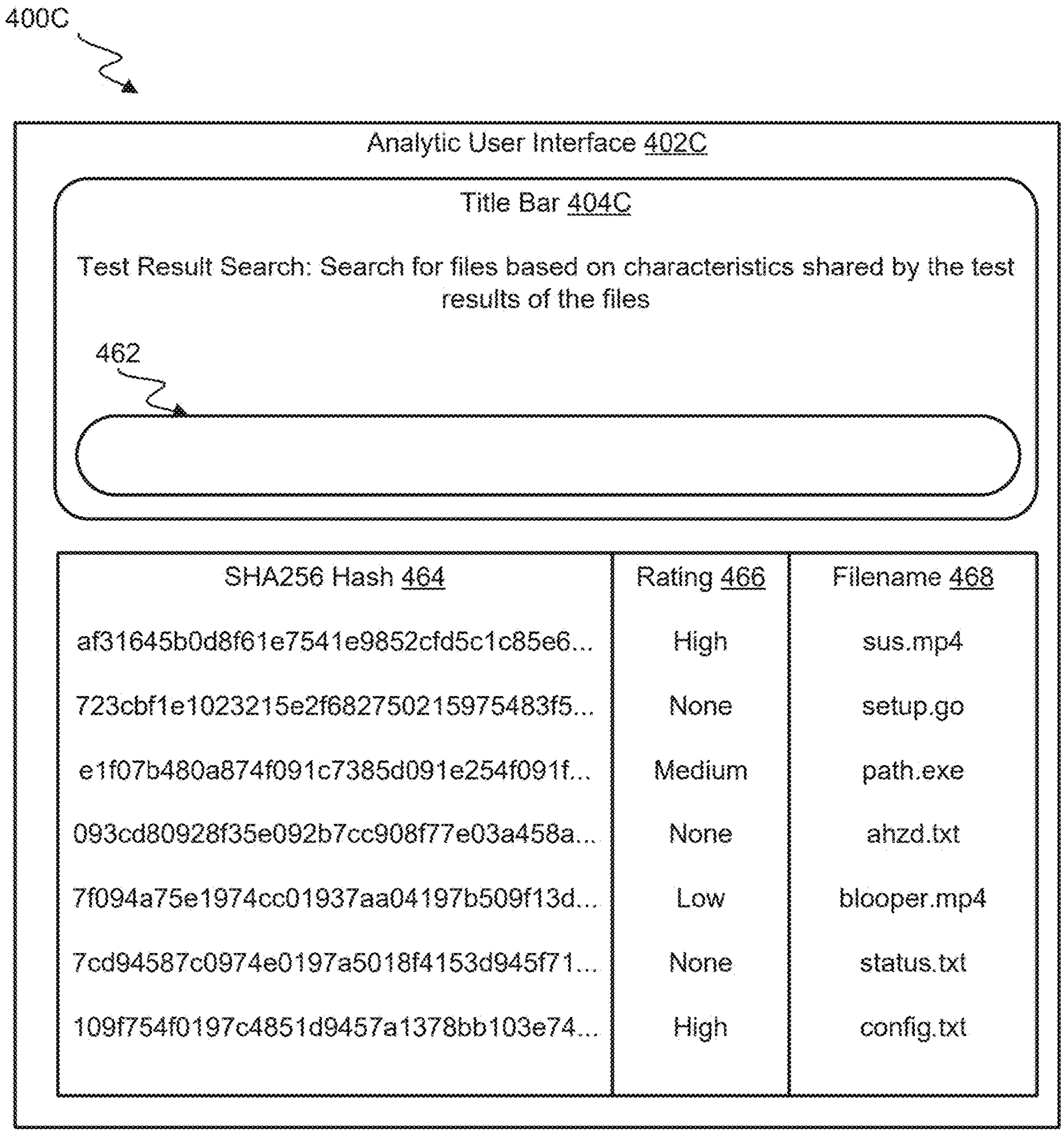
FIG. 4C illustrates an example user interface for searching for files based on shared characteristics of test results.

FIG. 4C illustrates an example user interface 400C including analytic user interface 402C for searching for files based on shared characteristics of test results. As shown, analytic user interface 402C includes a title bar 404C that describes the page is for searching for files based on characteristics shared by the test results of the files. Search bar 462 provides an option for inputting different search criteria. The search criteria may be field-specific, such as "rating-high" or field-generic, such as "config". The field-generic search input may be used to search all available fields to find files that have test results matching the search. The field-specific search input may be used to search the specified field, such as "rating" 466 in the example above, to find files that have field values for that field matching the search. As shown, analytic user interface 402C also shows, for each result, SHA256 hash 464, rating 466, and filename 468, with each row of data corresponding to a different file. In other examples, different combinations of fields may be shown for each file.

In some embodiments, the analytic application is software within the analytic application platform of the analytic environment. The analytic application can be accessed as an app (e.g., via SPLAT), which controls operations occurring in dedicated VMs/containers on the application platform. In some other embodiments, part or all of the analytic application's operations occur in a tenancy other than the cloud-controlled environment in which the test modules operate. For example, first operations that transform input data (e.g., source code, a binary source file, raw data, or first-entity-generated results) into log messages may occur at a first tenancy, and the log messages can be transmitted to a second tenancy to perform module-based processing (e.g., where the first tenancy is a client tenancy and the second tenancy is a cloud infrastructure tenancy or the reverse). As another example, a client tenancy may transmit input data sets (or links to the same) to a cloud infrastructure tenancy to generate log messages, which may then be transmitted back to the client tenancy to assess using one or more local or cloud-based modules. As yet another example, all operations may occur within a client tenancy such that no other tenancy has access to interim or final results.

The cloud infrastructure may include an analytic environment for automated, semi-automated, and manual static analysis, such as that analysis that can be performed asynchronously with the files becoming available and being tested. The analysis may be done on test results extracted from the communication-controlled cloud environment, which may or may not contain any source code, and/or on source code portions or snippets extracted from the communication-controlled cloud environment within the data export policies of the communication-controlled cloud environment.

The static analysis may pull in information from other locations, for example libraries and other sources referenced by the file, to be incorporated into the analysis. For example, references to open-source libraries detected by the test modules may be logged, and the open-source libraries may be later reconstructed in the analytic application based on publicly available information about the open-source libraries. As another example, references to public data sources may be detected by the test modules, and content from the references may be stored for analysis. The analysis may run tests on incorporated files separately or together with the code under review, and results from the analysis of the other information pulled in may be stored as separate test results for the separate files, or as part of the test results for the file that caused the other information to be pulled in.

In one embodiment, if a module is added or updated, files already tested and summarized may be queued for re-testing and/or re-summary by the added or updated module at the exclusion of other modules. The module may keep track of which files, based on file hash identifiers, have been analyzed already by the module or not, so the modules do not unnecessarily re-analyze existing files if there have not been any additions or updates to the module. In one embodiment, the modules are triggered for possible analysis, if such analysis has not already been performed, when code is pushed into production, for example, by being stored in a particular location. The triggering of the modules may be accomplished by a temporary sharing of the code being pushed to production in the particular location, and the temporary sharing of the code may expire once the code is marked as clear of malware or other indicators of compromise. Such a marking or clearance may have an expiration time at which the marking or clearance is implied.

In one embodiment, the analytic application includes options to upload files directly to the analytic application, to review test results reported to the analytic application from remote cloud environments such as communication-controlled cloud environments with data export policies in place, and/or to update or make comments on provide ratings (e.g., malicious, suspicious, unknown, okay, unreviewed, no priority, low priority, medium priority, and/or high priority) of such files or results. The analytic application may identify the files based on a file's hash, such as an SHA256 hash, and may display other metadata about a file such as rating, filename, file type, etc.

Test modules may perform tests directly on the manually uploaded files or archives of files, and the test results of the manually uploaded files or archives of files may be shown along with test results performed on automatically uploaded files from one or multiple tenancies configured to report test results (but not the files themselves) to the analytic application. Each file may be identified based on a hash of the file, and selecting the file may show details about test results from different modules that are active for testing uploaded files. The tests may be triggered upon upload.

The analytic application may also show the test results produced from each of the test modules for the file. For example, the analytic application may show the file details determined from a file details module that reports filename, MD5 hash, SHA1 hash, SHA256 hash, SHA512 display, file type, file size, file entropy, line count, last seen, and number of times seen. The analytic application may show file attributes from a file attributes module; an entropy calculation for the file or lines of the file from an entropy calculation module; android XML file permissions information from an android XML file permissions parser module; PE and ELF file attributes from a PE and ELF file attributes module, a file size calculator from a file size calculator module, function calls from a function call parser module, which may show name, pattern, kind, scope, and scope kind for function calls in the file for C, C++, C#, Java, Javascript, and other source files; FLARE obfuscated string solver (FLOSS) from a FLOSS module; strings from a strings module; file hashes from a file hash module, which may show the MD5 hash, SHA1 hash, SHA256 hash, SHA 512 hash, SSDeep hash, etc.); inline ASM from an inline ASM detection module for C, C++, and other source files; ClamAV from a ClamAV module, Yara from a Yara module; Base32/64 detection and decoder from a base32/64 detection and decoder module, source file line count from a source file line count module, IP and domain parser from an IP and domain parser module; Detect It Easy (DIE) from a DIE module; and possible encoding from a possible encoding module. For example, ClamAV may detect that a file is potentially malicious and include a known threat name in association with the file.

The analytic application interface may also include options for filtering files or collections of files that match certain signatures, test results, or other characteristics, to find other files that have similar or same values for signatures, test results, or other characteristics.

The code mapped to the test results or code metadata may be filtered or sorted based on which functionality is used by the code, as indicated in the test results. Code that includes certain function calls or certain function definitions may be pulled up together for a code base, all without exporting the code from the tenancy where the code resides. In this manner, unknown code may be filtered based on a structure or functionality common to the code, and additional testing or analysis may be done to support an investigation into the code base without having access to the code base.

In one embodiment, a bulk file tracking interface of the application provides a view of collections of files that share certain characteristics. The collections may be for files from a same SBOM, at a same time or from different times, or software from a particular source or using a particular function. The collections may be filtered to include only those files or collections with a high or medium or other priority ranking, which may indicate a likelihood that the files are malicious. The view of the collections may include high-level details about the collections such as the SBOM ID, the number of times a log has been received for the SBOM ID, the number of files in the SBOM, a date in which the SBOM was uploaded, a date in which the SBOM was last updated or analyzed, and/or a last test run against the SBOM.

The analytic application may include an interface for adding new modules. The new modules may be added to a storage hierarchy where different modules are listed in the storage hierarchy. The module may take in a payload such as a filename, contents, and file type, and produce a module result. The module may perform any functionality on the filename, contents, and file type, and generate a structured result, such as a JSON result, which may be stored as part of test results from the modules that are placed in an object store for analysis by the analytic application. The new module is then added to the worker nodes that are instantiated when new objects are detected in the communication-controlled cloud environment, and the worker nodes then run the new module as part of processing the new objects, for export to the object store.

In one embodiment, the analytic application stores time-stamped metadata about characteristics of an SBOM at different times of testing the SBOM and potentially involving different versions of the SBOM. The metadata may differ over time, and the analytic application may highlight the differences that have occurred during a lifecycle of the SBOM, for example, by filtering out those characteristics that have remained the same and filtering in those characteristics that have changed, to provide a focused review of changes over time.

In one embodiment, a user interface of the analytic application includes a summary page or tracking page for showing only those reported results that have been automatically or manually marked or flagged with high, medium, or low priority, as malicious, suspicious, okay, unknown, or with any other label. The summary page may group together similar test results with aggregate information provided for the group. The issues may be efficiently managed using the summary page to sift through issues satisfying filter criteria and grouped to limit the number of separate issues exposed to the user.

As additional characteristics are detected to be associated with negative impacts or other indicators of compromise, or neutral or positive impacts, such characteristics may be added to new testing modules for testing unknown software for the characteristics and labeling the software as having a potential negative impact or neutral or positive impact based on the presence of or value of the characteristics. For example, a set of virus signatures or known negative impact keywords may be used to construct a test module that checks for the virus signatures and reports on whether the virus signatures were detected in code without providing a copy of the code as output. The virus signatures may be provided by or defined as YARA rules, which are patterns used to detect malicious or suspicious software. YARA rules may have strings to detect, conditions for how the strings are used, logical expressions or combinations of the strings and conditions, and a weight that determines a risk level if the conditions are met, with higher weights indicating higher risk. In various other examples, test modules may look for files that are packed or encoded differently from other files, such as a base 64 encoding for no apparent reason, or in-line assembly for no apparent reason, or a wrong file type (e.g., .mp4 file type for .exe contents), etc.

In one embodiment, one or more test modules check for domain names in or used by the code. The domain names or IP addresses may be detected as regular expressions matching patterns and may be compared with known domain names to determine a risk associated with the domain name or IP address. The analytic application may provide an interface to browse code metadata for code that contains or references a selected domain name or IP address.

Machine Learning

In one embodiment, the test results are fed into a machine learning model or big data analysis engine in the analytic environment for identifying malicious, suspicious, or high priority content and distinguishing the malicious, suspicious, or high priority content form other content. The machine learning model or big data analysis engine may use results from the logs and derivations of the results as feature vectors that are matched against feature vectors of known malicious, suspicious, or high priority content. For example, the machine learning model may determine cosine similarities between the observed data and known content in categories with negative security or privacy impacts or other indicators of compromise, and select the observed data closest to known content with negative impacts for display in a summary. The known content may be labeled content, such as malware, that has been previously identified as malicious. The machine learning model or big data analysis engine may further output a label such as "predicted malicious," "predicted suspicious," or "predicted high priority" based on historical data in the corresponding category, malicious, suspicious, or high priority.

Investigation-Bound Cloud Environments and Restricted Subnets

An analytic application may be hosted in the cloud infrastructure outside of any specific tenancy, configured as a resource principal with permissions to launch virtual machines, set up instances, control state of labs (sets of virtual environments that share one or more common characteristics, such as a common subnet), etc. The application may host labs of different types, such as forensics, malware, and open source intelligence analysis (OSINT) labs, where one or more virtual machines may be set up within a restricted subnet specific to the lab or type of lab. The different types of labs may include different default operating systems, different default software application installations, and/or different default modules of a software application. The user interface of the analytic application may allow addition of or deletion of secure execution environments from a lab, and/or may allow separate secure execution environments to be created and customized independently of a designated type of lab and default lab characteristics. The cloud infrastructure, via the application's configuration of the virtual environment, controls traffic into and out of the restricted subnet and lab(s) within the restricted subnet, for example, controlling who can access the restricted subnet and what resources the restricted subnet can access. For example, the subnet may be allowed or restricted from accessing license servers and/or allowed or restricted from accessing the Internet.

In one embodiment, a set of virtual environments may share the same subnet. The set of virtual environments may be instantiated with the same or similar configuration parameters to perform various investigations on software within the virtual environments. The set of virtual environments may be shared with other users of the analytic application, and the other users may connect to the virtual environments using remote desktop protocols, SSH, or otherwise. If there was one server and deployed VMs, the deployed VMs might be able to communicate with each other depending on the user's configuration settings. In one embodiment, because every lab is deployed on a separate subnet, and because the user cannot change that every lab is deployed on a separate subnet due to restricted user permissions in the analytic environment, the user cannot make the labs communicate with each other because the user has no permissions to do so.

Figure 1B:
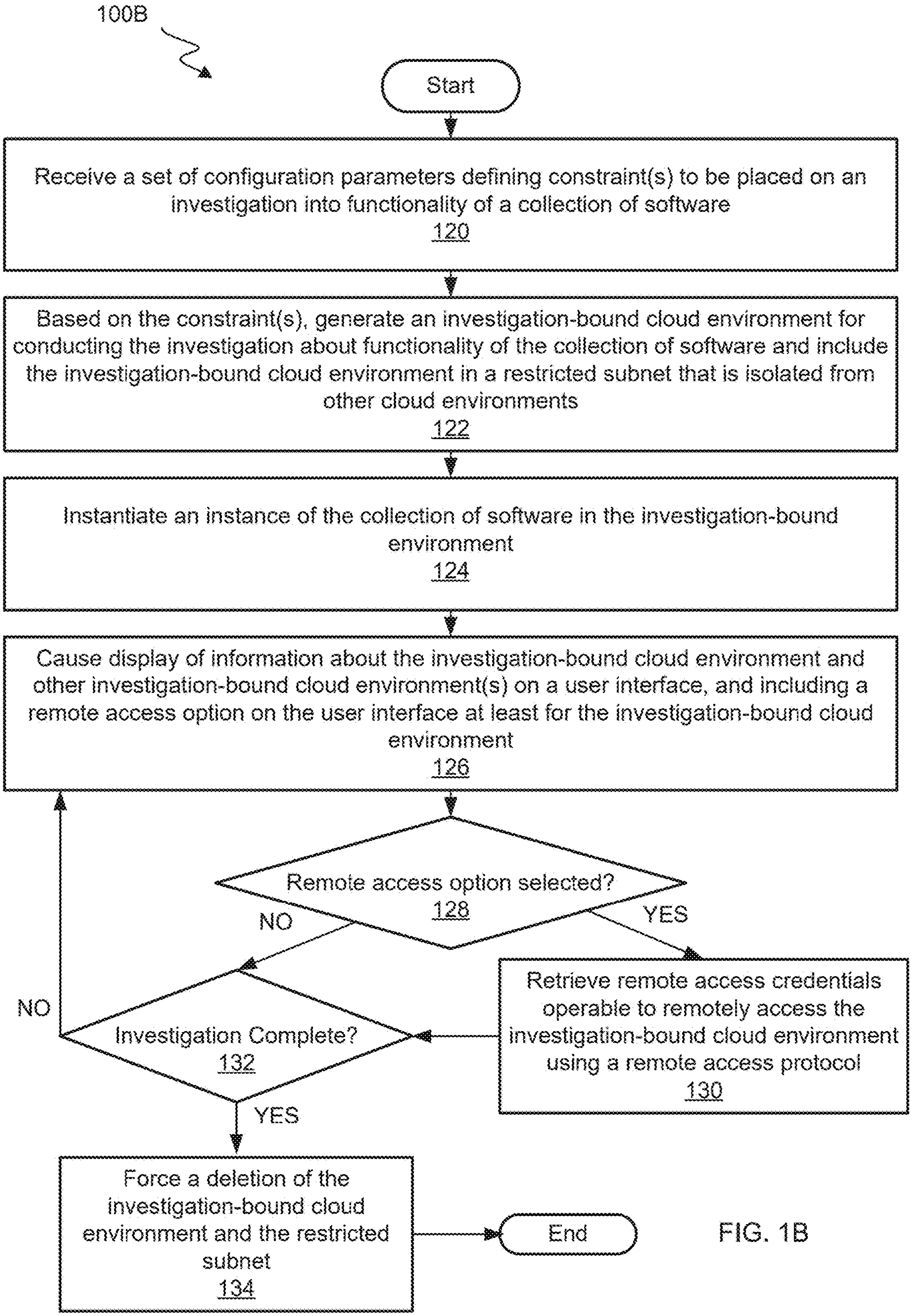
FIG. 1B illustrates a flow chart depicting a workflow of an example process for generating and deleting an investigation-bound cloud environment in a restricted subnet.

FIG. 1B illustrates a flow chart depicting a workflow of an example process 100B for generating and deleting an investigation-bound cloud environment in a restricted subnet. As shown, process 100B begins in block 120, where a set of configuration parameters is received that defines constraint(s) to be placed on an investigation into functionality of a collection of software. Based on the constraint(s), in block 122, process 100B generates an investigation-bound cloud environment for conducting the investigation about functionality of the collection of software and includes the investigation-bound cloud environment in a restricted subnet that is isolated from other cloud environments. In block 124, process 100B then instantiates an instance of the collection of software in the investigation-bound environment. In block 126, a user interface of an analytic application causes display of information about the investigation-bound cloud environment and other investigation-bound cloud environment(s). The user interface includes a remote access option for at least the investigation-bound cloud environment. If the remote access option is selected, as determined in block 128, the analytic application retrieves remote access credentials operable to remotely access the investigation-bound cloud environment using a remote access protocol in block 130. The remote access protocol may be offered directly through the analytic application or through another application that consumes the remote access credentials as retrieved and provided by the analytic application, optionally as further coordinated by the user of both applications.

A determination may then be made whether the investigation is complete in block 132. If so, a deletion of the investigation-bound cloud environment and the restricted subnet is forced by a database or the analytic application, which maintains control over the investigation-bound cloud environment and the subnet via database access controls configured for the investigation-bound cloud environment. If the remote access option is not selected, as determined in block 128, the determination may be made in block 132 on whether or not to delete the investigation-bound cloud environment in block 134. Whether or not the investigation-bound cloud environment is not deleted, process 100B may continue showing information about the environments in the analytic application in block 126.

Figure 3:
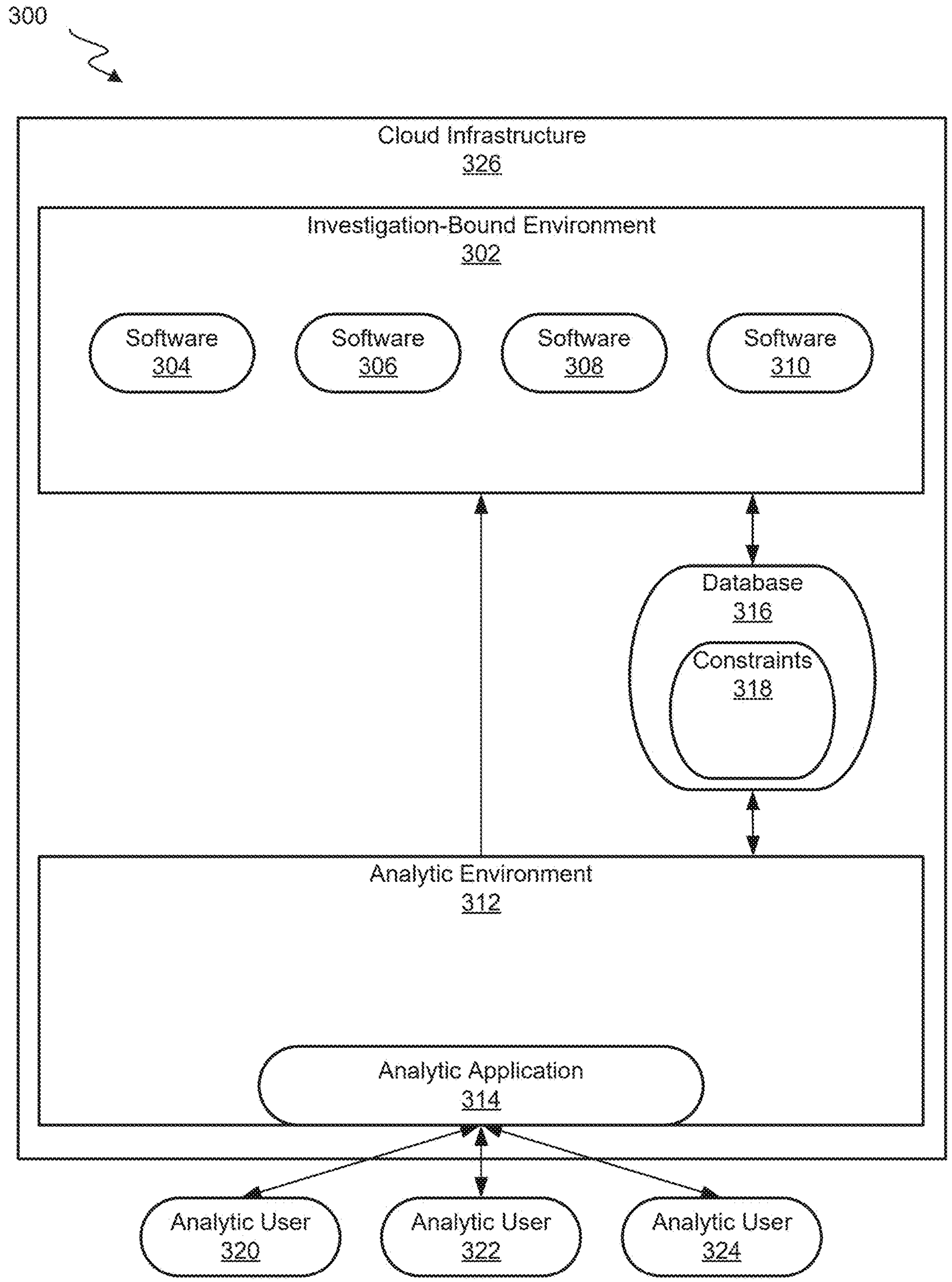
FIG. 3 illustrates a diagram of an example cloud architecture that includes an investigation-bound cloud environment controlled from an analytic environment.

FIG. 3 illustrates a diagram of an example cloud architecture that includes an investigation-bound cloud environment controlled from an analytic environment. As shown, cloud infrastructure 326 includes analytic environment 312 and database 316 for generating investigation-bound environment 302 and loading software 304, 306, 308, and 310 into investigation-bound environment 302. Analytic users 320, 322, and/or 324 may interact with an interface of analytic application 314 to determine constraints 318 that should be applied to investigation-bound environment 302 and persisted in database 316. The constraints 318 may include time constraints, communication constraints, and/or other constraints that may be implemented using database access controls or otherwise via application components.

A virtual environment or set of virtual environments may be created with a user-selected option on whether or not internet access is allowed, an automatic expiration date on which the virtual environment or set of virtual environments is automatically destroyed, a description of the investigation for which the virtual environment is being created, a group of users with which the virtual environment or set of virtual environments is shared, and other optional configuration parameters. In one example, when creating a lab, the analytic application provides an option to choose whether to connect the lab to the internet or not, for example, so the user can explore malicious sites and their effects in a safe environment.

The application's configuration of the virtual environment may also specify a time (e.g., minutes, hours, days, weeks, or months) for which the virtual environment is to remain alive and/or an investigation for which the virtual environment should remain in existence. At the end of the time or end of the investigation, the cloud infrastructure, via the application's configuration of the virtual environment, may force a deletion of the investigation-bound cloud environment and the restricted subnet. All the artifacts, the infrastructure artifacts, and the instances and the network that the lab is in are destroyed. This ensures labs that are toxic do not stay up and running in the background, and ensure that computing resources are not wasted on unused labs. In other words, the investigation-bound cloud environment is ephemeral in the sense that the environment is created for the investigation and destroyed in a manner that is planned before the environment was created. Creation of the investigation-bound cloud environment may include specifying a name, description, sharing group, specifying connection details, and a termination policy for the investigation-bound cloud environment. The investigation-bound cloud environment may also be terminated manually via the application interface.

Forcing the deletion of the environment and the subnet may destroy all virtual resources associated with the environment and the subnet and all evidence of the environment and/or subnet's prior existence except for optionally an environment history log of the date(s) the environment was created, destroyed, and/or modified, the name of the environment, the type of environment, the creator of the environment, the contact email of the creator, the description of the environment, Internet and resource access settings for the environment, the automatic expiration date of the environment, the user sharing setting for the environment, and historical status updates for the environment (e.g., created, running, etc.), the configuration settings that were used for the environment and/or subnet, and/or any other metadata about the environment or subnet without retaining virtual resources that were created by the environment or subnet themselves.

In one embodiment, a lab or secure execution environment is built with access to and/or installation of software according to a software bill of materials. The SBOM may vary from lab to lab or from secure execution environment to secure execution environment.

In one embodiment, the virtual machines created by the application operate in a separate compartment such as a dedicated virtual machine hypervisor. If there is a malware breakout, the dedicated virtual machine hypervisor limits exposure to the malware of other cloud infrastructure components. The use of labs and/or secure execution environments supports thorough and/or custom code investigations in a manner that protects against code leaks and malware spread. Further, the approach is modular in both function and architecture regarding where labs can be deployed (e.g., in that it may use various modules in various environments/environment combinations).

In one embodiment, a secure execution environment or lab may include constraints on what data can be output from the secure execution environment, optionally dependent on the type of investigation being performed. An agent within the secure execution environment, and/or a gateway operating at an edge of the secure execution environment may control communications going into or coming out of logical components within the secure execution environment. Several example controls are described in the section entitled "Exporting Test Results Subject To Data Export Policies" (describing communication controls). The environment may be terminated when the investigation is complete. In a particular example, a lab or secure execution environment may include test modules that run tests against code that is made available to the lab or secure execution environment, and outputs of the test modules may be checked to determine whether the outputs comply with one or more data export policies of the lab or secure execution environment.

Labs and/or secure execution environments may be shared between groups of users to facilitate collaboration on analysis of software in the lab or secure execution environment. The different users or groups of users may access the labs and/or secure execution environments to which the users or groups of users have access via an interface of the analytic application.

The interface may provide a list or table of available labs and/or secure execution environments, and metadata about the labs and/or secure execution environments may be displayed as well as options to configure, terminate, or view additional details for the labs and/or secure execution environments. The metadata may also include information about the lab or secure execution environment such as test results obtained for the lab or any other information described in the sections entitled "Source-Code Testing Agent Within A Communication-Controlled Cloud Environment" (describing information produced by modules) and/or "Analyzing The Test Results In An Analytic Environment" (describing information analyzed in the analytic application). The metadata may include, for example, information about the instance(s) and login info for the lab or instance(s). In one example, a lab may be accessed using credentials for a single jump host that allows access to multiple instances within the lab.

The listing of labs and/or secure execution environments may also include controls for the labs and/or secure execution environments, to make configuration changes, de-activate, or delete selected lab(s) and/or secure execution environments. The controls allow a user to quickly configure labs and/or secure execution environments using a high level view while other labs and/or secure execution environments are visible concurrently together.

In one embodiment, the analytic application includes a user interface for controlling virtual environments. The analytic application may include an option to create or modify a virtual environment and/or to view, modify, delete, or instantiate any instance of the virtual environment that is running, is available for creation, or has been created. The analytic application may include an option to terminate all instances of the virtual environment of the same type. The analytic application may also include an option to share an instance of the virtual environment, individually or by type, with another user or group of users.

The analytic application provides a user interface for performing a jump to a remote jump host that has local access to the instance and/or using a remote desktop operation with the instance to gain control of the instance, and/or for connecting to the instance via SSH or via a bastion server such as one which may use a session for which inputs and outputs are monitored by the cloud infrastructure.

In one embodiment, the analytic application may instantiate a virtual environment multiple times for an investigation, and multiple versions of the virtual environment may be running concurrently. The analytic application may have an option to, as a unitary group of instances using a single selection, share the instances of the virtual environment with a user or group of users. Upon sharing the instances, other users or groups of users would see the instances and have same or different management options with respect to the instances, depending on the user configurations. The analytic application may also have an option to, as a unitary group of instances using a single selection, delete the instances and any corresponding subnets or other virtual artifacts or resources that exist for the instances.

An analytic application may run in an analytic platform of an analytic environment to provide a graphical user interface to users for analyzing labs, secure execution environments, and/or test results from the labs or secure execution environments. The user interface can be used to create labs and/or to otherwise create instances or environments to analyze malware in. The instances deployed are virtual machines in the cloud where malware analysis can be performed, boxes can be corrupted, open source intelligence can be gathered, VPNs can be used, and malware can be detonated. For example, dynamic analysis of malware may be performed where malware is opened and "enable macros" is clicked.

In one embodiment, a lab of multiple virtual environments and/or individual secure execution environments are ephemeral in that the lab or secure execution environment expire upon the completion of a task or expiration of a timer, whichever occurs first. The ephemeral characteristic of labs and secure execution environments makes them suitable for malware analysis where eventual deletion may be desired, particularly after malware detonation.

In one embodiment, a central resource like a database that has permission to spin up the lab and/or secure execution environments to build an interface where a network and VM can be set up with guard rails (e.g., communication controls, termination conditions, such as automatic termination when an investigation is complete or a timer expires, and/or other privacy or security filters) for the analyst or security operator to prevent mistakes from reaching the greater cloud environment.

In one embodiment, multiple secure execution environments and/or labs are allowed, by the database in an example configuration, to communicate with each other to detonate malware and trigger downstream commands for emulating traffic and troubleshooting information about what goal the malware is attempting and how the malware is attempting to accomplish the goal.

If malware detection is done in the cloud environment in one or more execution environments, there is inherently more risk because the cloud is network-managed. Leaks may be limited from above and below, in the data center and among physical machines, and/or within machines of the same real application cluster (RAC). Because labs are implemented in the cloud, a machine controlling the lab may be remote and could be in a different location from the machine hosting the lab. The machine controlling the lab and the machine hosting the lab may have remote networking connectivity, which may open the attack surface without communication constraints being placed on the lab such as which ports are allowed to communicate with which virtual resources and which ports are managed by an agent or gateway that restricts access. A cloud provider may use compute instances within a dedicated virtual machine host. In this embodiment, the interface to launch the labs may be built on top of the database with restrictions on who can access the database and launch the lab via the database resource constraints on the users that have access to control the lab. The users and the environment itself is prevented from performing operations that are not allowed based on the database resource constraints enforced by the database.

The database and analytic application platform, including the analytic application and the analytic environment, may be within a cloud provider tenancy that manages cloud resources for a plurality of cloud consumer tenancies. Use of the analytic application may involve analysis of data gathered from different tenancies, labs and/or secure execution environments created in different tenancies, and different malware notifications or other notifications of indicators of compromise being sent to different tenancies possibly involving a same pattern or same source of threat.

An analytic application may provide access to the users to control the labs. The analytic application may operate on an analytic application platform, with multiple analytic application environments operating in a tenancy. The analytic application may be provided with input data, and the input data may be stored ephemerally in a lab or secure execution environment, or persistently in a database or object store accessible to the analytic application. The database and/or object store may be accessible to users of the reviewing cloud entity and/or the originating cloud entity. In one example, different users may access a lab for different purposes at the same time using any of the various access credentials provided.

A control system in analytic application platform is an application that is configured as resource principal to control and support various labs (pertaining to different types of investigation), and various instances of secure execution environments (pertaining to various source-code collections or versions that are being investigated). For example, different types of labs can include forensic labs, malware labs, keyword-detection labs, etc. (The labs need not be security related.) The control system has permissions to launch VMs/containers, set up instances, and control states of labs (to control whether they can be operated), etc.

For each lab instance, the control system initiates one or more VMs/containers and a restricted subnet within which the VMs/containers are to operate. So long as a given restricted subnet exists, the VMs/containers assigned to the restricted subnet are on VM hypervisors dedicated to that subnet (to promote data privacy and reduce a risk of malware spread). These dedicated resources operate separately from the control plane but are configured to send analysis results (such as log messages or structured datasets) back to the control plane.

Setting up a restricted subnet may include specifying user permissions/constraints, which may indicate which users (or groups of users) are permitted to have access to the subnet (e.g., to control VM/container operations and/or to receive results from VM/container operations), to have access to one or more networks (e.g., the Internet), and/or to have access to each of one or more license servers.

The operations are defined by corresponding authorized users to perform static analysis of source-code files in a privacy-preserving manner. More specifically, input data (e.g., which may be identified within an input SBOM) can be uploaded to the analytic application app (from the analytic application platform or an automated process pushing files to buckets, which are then ingested by analytic application). The analytic application then performs static analysis of source-code files within the dedicated environment, but, in one embodiment, only limited results of the static analysis (e.g., log files capturing concerning results) can be output from the dedicated environment. The analytic application can support individual authorized users accessing a given instance (e.g., via VPN/SSH) to perform analyses, to orchestrate analyses to be performed on unknown data to be provided outside the access of the users, and/or to select log records that are to be or have been output, for review.

In one embodiment, the analytic application supports static analysis, which may include automated analysis performed (e.g., concurrently performed) by one or more "modules". An authorized user may select between one or more predefined modules. Additionally or alternatively, the authorized user may define a module. A result of a processing performed by a module can be one or more log messages (e.g., JSON log messages), which may include an IP address, domain name, encoded string, etc. Example tests that may be performed include, but are not limited to, tests described in the sections entitled "Source-Code Testing Agent Within A Communication-Controlled Cloud Environment" (describing test modules) and/or "Analyzing The Test Results In An Analytic Environment" (describing analyzing results of test modules).

When the static analysis is complete, an instruction may be received to terminate a given instance or a whole lab, which may release the assignment of the corresponding VMs/containers. A release of the container causes the entire container to be deleted. This temporary existence of the resources for the static analysis is supported by an ephemeral container environment that is deleted upon completion of the investigation or expiration of a timer.

Automatic provisioning of labs and/or secure execution environments may be performed using a variety of available images, including, for example, Windows Server with Flare VM tools installed, Ubuntu with the REMnux and/or Android tools installed, Oracle Linux, and *Kali* Linux. Various operating systems may have different combinations of toolkits pre-installed in the virtual environment for analysis or troubleshooting of, for example, privacy or security issues.

Figure 4D:
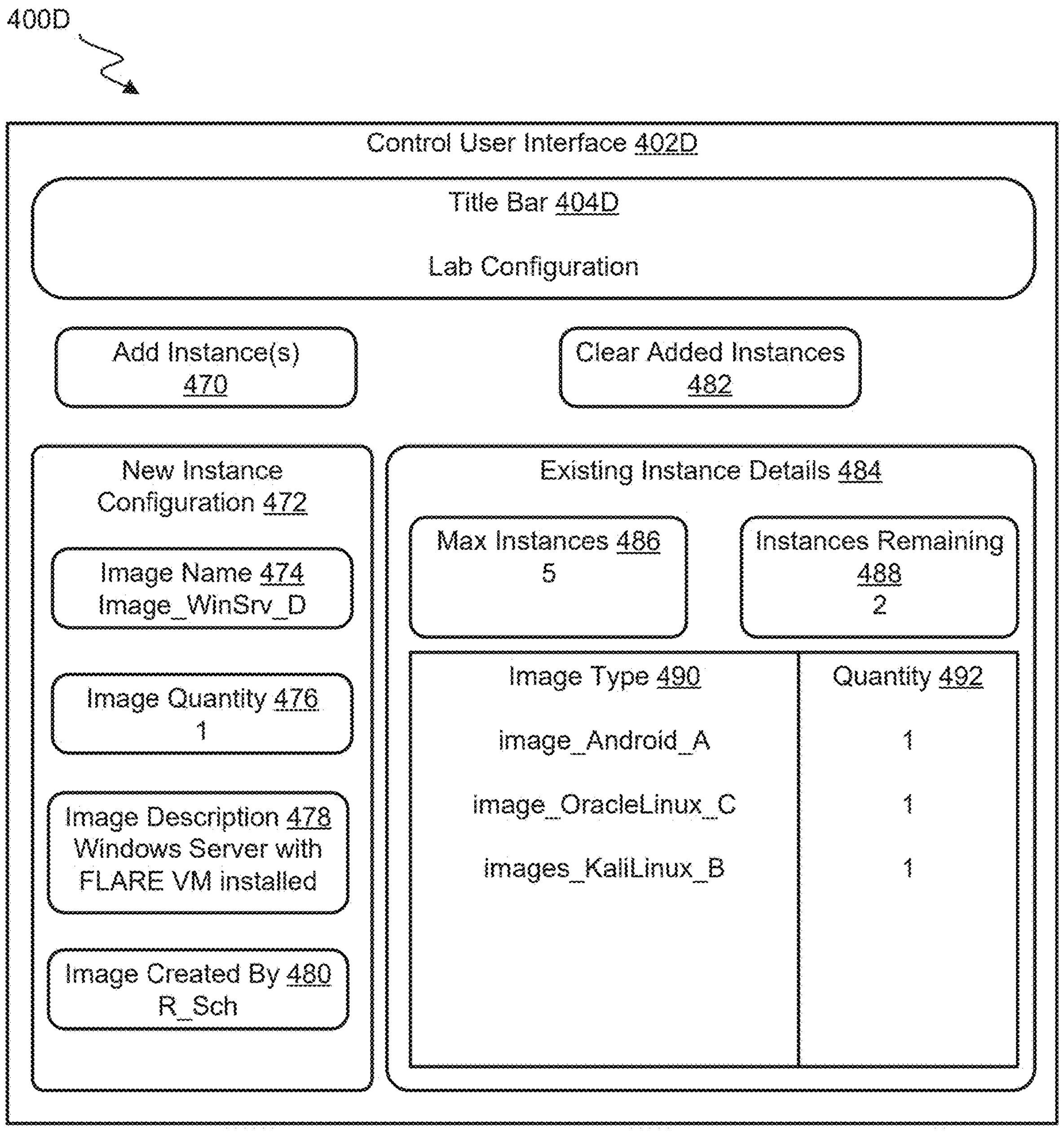
FIG. 4D illustrates an example user interface for adding instances to a lab and removing instances from the lab.

FIG. 4D illustrates an example user interface 400D that includes control user interface 402D for adding instances to a lab and removing instances from the lab. As shown, control user interface 402D includes title bar 404D showing that the page is about lab configuration. In a new instance configuration region 472, options are provided to specify image name 474, image quantity 476, image description 478, and record a user who created the image 480, as well as other settings. Once configurations are set, an instance may be added with a selection of "Add Instance(s)" button 470, which causes the selected configuration of instance to be added to existing instance details region 484 and for the instance to be instantiated in an isolated cloud environment. Existing instance details region 484 includes information about a max number of instances 486 for the lab, for example, 5 as shown. Existing instance details region 484 also includes information about instances remaining 488 that are available to be added within the maximum, 2 as shown. Existing instance details region 484 includes, for each instance in the lab, details about instance type 490 and quantity 492. Existing instance details region 484 may also include controls to delete or modify regions individually (not shown) and a button to "Clear Added Instances" 482, which, when selected, deletes all instances in the lab.

Once a virtual machine or set of virtual machines is created, the analytic application allows users to view and edit details of the set of virtual machines, connect to virtual machines in the set, and/or modify a state of the instances. The analytic application provides various options for connecting to virtual machines in the set. For example, the analytic application may include SSH connection details that can be copied or instantiated to form an SSH connection with the virtual machine, RDP connection details that can be copied or instantiated to form an RDP connection with the virtual machine, such as remote desktop viewing using a graphical user interface, an RDP PC Name that can be copied to support RDP connections, and login instructions including usernames and/or passwords for accessing the virtual machine. For example, the RDP connection details may be input into a terminal to connect to a jump host, or the analytic application may provide a direct interface to the terminal or RDP client. The RDP client may be used to connect and log into the instance's desktop. A unique username and/or password may be randomly generated by the analytic application when the virtual machine or set of virtual machines is created, and may be different for different virtual machines or different sets of virtual machines.

After logging into the instance using RDP (for example, by the analytic application on behalf of a user selection or by the user), the user the analytic application may interact with the instance's environment, run software, open a browser, navigate to web sites, etc.

After an investigation is complete, a virtual machine or sets of virtual machines may be deleted with a click or selection indicating that the investigation is complete. The virtual machine or set of virtual machines may alternatively be deleted automatically upon expiration of a timer that is configured upon creation of the virtual machine or set of virtual machines by the analytic application.

In one embodiment, the analytic application includes an option to create a pre-configured single instance of a virtual environment that lasts a fixed amount of time with a click of a button on a "rapid deployment" interface. The single instance may include a variety of virtual machine image options, one of which is automatically instantiated when selected in a single or double click. A high-level configuration feature such as "Internet access" may be toggled on or off prior to the click via a checkbox, for example. Rapid labs are quick preconfigured deployments with designated combinations of software installations that are launched, stay up for a fixed time (e.g., 24 hours, unless deleted or completed beforehand), and are deleted and cleaned up at the end of the fixed time or when an investigation is marked as completed or the rapid lab is manually deleted. Rapid labs may or may not be deployed in the same subnet, depending on the configuration.

FIG. 4A illustrates an example user interface 400A including a control user interface 402A for rapidly launching an instance with a single selection. As shown, control user interface 402A includes title bar 404A that provides instructions for rapid deployment. As shown, the instructions read, "Single containment environments are available for rapid deployment. Instances last for 24 hours before being auto deleted. Click "Launch Instance" to create an instance." Control user interface 402A also includes available image listing 406, which lists available image names 408, image descriptions 410, and options to launch 412 or provide internet access 414. In particular, launch instance buttons 416, 418, 420, and 422 provide a single-click or single-selection (e.g., click, double-click, or tap) interface for generating an instance with preconfigured characteristics. Checkboxes 424, 426, 428, and 430 allow an extra selection to be provided prior to the single selection if Internet access is desired in the environment, by toggling the checkbox on.

The user interface of the analytic application may also include a section for sharing results from different file analyses from different labs and/or secure execution environments, where the results or observations may be compared across many files, and where files may be grouped based on similar characteristics, test results, or observations.

An output of synchronous and/or asynchronous analysis of labs and/or secure execution environments is combined in the interface. Bulk analysis may be performed across multiple results to determine patterns and sources that are suspect and that may be spread out over several tenants using a cloud service. The interface allows analysis of multiple files across various builds, with time-bounded results and asynchronous tests incorporated into the analysis. For example, an interesting domain or file characteristic may be seen and searched across multiple builds to determine where else the interesting domain or file characteristic has been seen before.

In various embodiments, the labs or secure execution environments may support interim analyses and comments to be stored within the lab or secure execution environment, and these interim analysis and comments may be deleted when an ephemeral container including the lab or secure execution environment is deleted. The labs or secure execution environments may also support limited data export according to one or more data export policies for the lab or secure execution environment. The data export from the lab or secure execution environment may have limits such as those described in the section entitled, "Exporting Test Results Subject To Data Export Policies" (describing communication controls), which may be enforced by an agent within the lab or secure execution environment and/or a gateway at an edge of the lab or secure execution environment.

Re-Configuring the Testing Agent Based on the Analysis

Synchronous or asynchronous analysis may result in a determination that new information would be helpful for completing an investigation of the private data under analysis, such as source code being tested by test modules. The analytic application may determine, with user input manually or semi-automatically or without user input automatically, that certain test(s) would be helpful for gathering more information to analyze the private data. For example, if the analytic application determines that a partial pattern match is found between the private data and an indicator of compromise, the analytic application may gather more information to determine if a more complete pattern match is found with the indicator of compromise. In a specific example, the partial pattern match may be a match of a portion of code in the private data with an open source library that has a known security vulnerability. The additional test that may be performed may be to check whether a security patch has been applied to the portion of code in the private data to mitigate or eliminate the known security vulnerability. The analytic application may trigger a check for the patch upon detecting a hash signature matching the code having the security vulnerability, and the check may be carried out by a test module implemented to test code for certain security patches.

In various other embodiments, other actions may be taken with respect to the cloud infrastructure or code maintained for the data originating entity based on the synchronous or asynchronous analysis. Preventative actions may be taken. Sites may be blacklisted from network traffic. Resources may be quarantined. Notifications may be sent to trigger manual intervention. Any action taken may be supported by the analytic application operating in coordination with local or remote systems, and with or without user involvement.

Computer System Architecture

Figure 5:
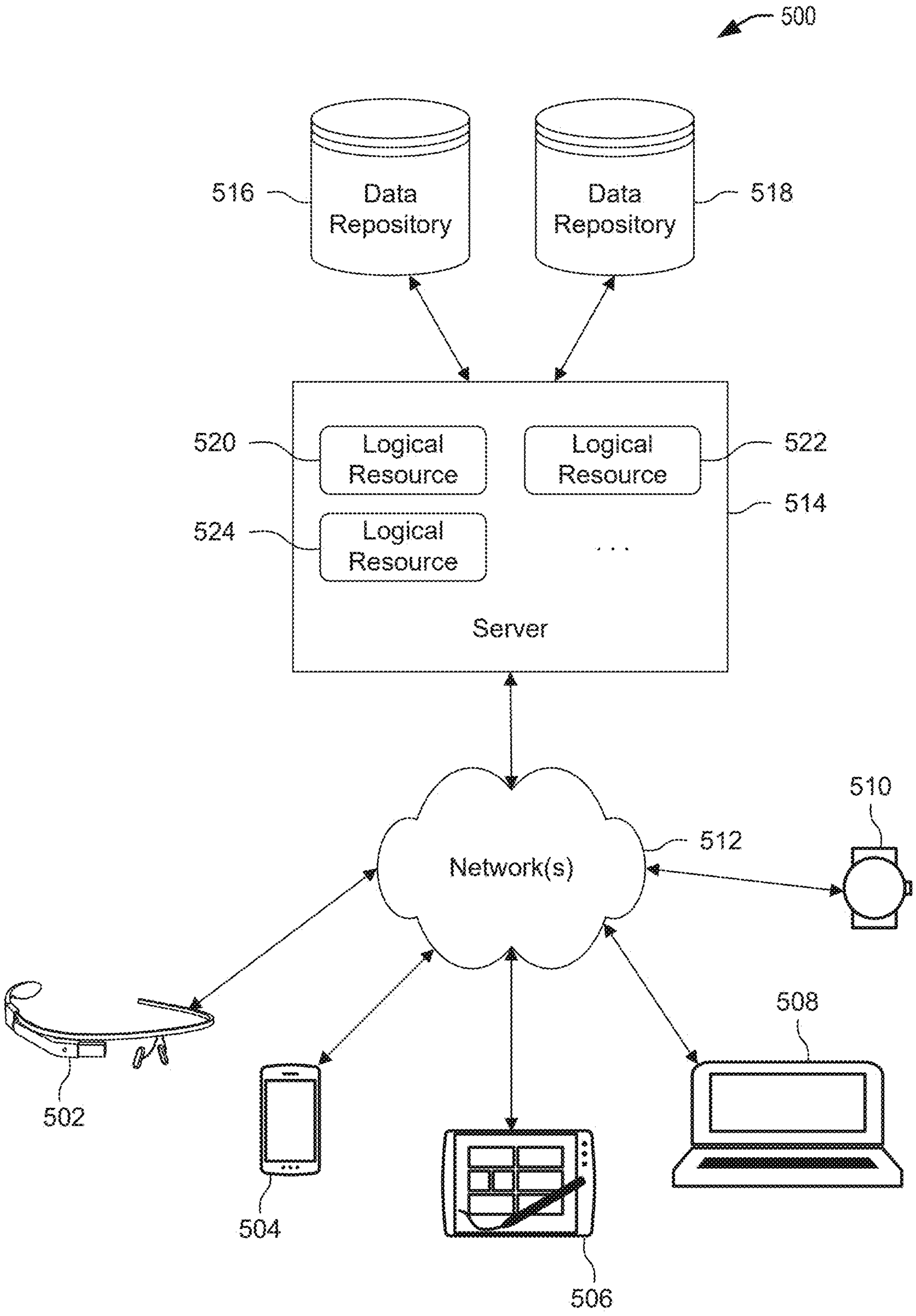
FIG. 5 depicts a simplified diagram of a distributed system for implementing certain aspects.

FIG. 5 depicts a simplified diagram of a distributed system 500 for implementing an embodiment. In the illustrated embodiment, distributed system 500 includes one or more client computing devices 502, 504, 506, 508, and/or 510 coupled to a server 514 via one or more communication networks 512. Clients computing devices 502, 504, 506, 508, and/or 510 may be configured to execute one or more applications.

In various aspects, server 514 may be adapted to run one or more services or software applications that enable techniques for controlling, using, and analyzing isolated environments.

In certain aspects, server 514 may also provide other services or software applications that can include non-virtual and virtual environments. In some aspects, these services may be offered as web-based or cloud services, such as under a Software as a Service (Saas) model to the users of client computing devices 502, 504, 506, 508, and/or 510.

Users operating client computing devices 502, 504, 506, 508, and/or 510 may in turn utilize one or more client applications to interact with server 514 to utilize the services provided by these components.

In the configuration depicted in FIG. 5, server 514 may include one or more components 520, 522 and 524 that implement the functions performed by server 514. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, 508, and/or 510 for techniques for controlling, using, and analyzing isolated environments in accordance with the teachings of this disclosure. A client device may provide an interface that enables a user of the client device to interact with the client device. The client device may also output information to the user via this interface. Although FIG. 5 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple Watch®, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 514 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 514 can include one or more virtual machines running virtual operating systems, or other computing architectures involving virtualization such as one or more flexible pools of logical storage devices that can be virtualized to maintain virtual storage devices for the server. In various aspects, server 514 may be adapted to run one or more services or software applications that provide the functionality described in the foregoing disclosure.

The computing systems in server 514 may run one or more operating systems including any of those discussed above, as well as any commercially available server operating system. Server 514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 514 may include one or more applications to analyze and consolidate data feeds and/or event updates received from users of client computing devices 502, 504, 506, 508, and/or 510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 514 may also include one or more applications to display the data feeds and/or real-time events via one or more display devices of client computing devices 502, 504, 506, 508, and/or 510.

Distributed system 500 may also include one or more data repositories 516, 518. These data repositories may be used to store data and other information in certain aspects. For example, one or more of the data repositories 516, 518 may be used to store information for techniques for controlling, using, and analyzing isolated environments. Data repositories 516, 518 may reside in a variety of locations. For example, a data repository used by server 514 may be local to server 514 or may be remote from server 514 and in communication with server 514 via a network-based or dedicated connection. Data repositories 516, 518 may be of different types. In certain aspects, a data repository used by server 514 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 516, 518 may also be used by applications to store application data. The data repositories used by applications may be of different types such as, for example, a key-value store repository, an object store repository, or a general storage repository supported by a file system.

In one embodiment, server 514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 6:
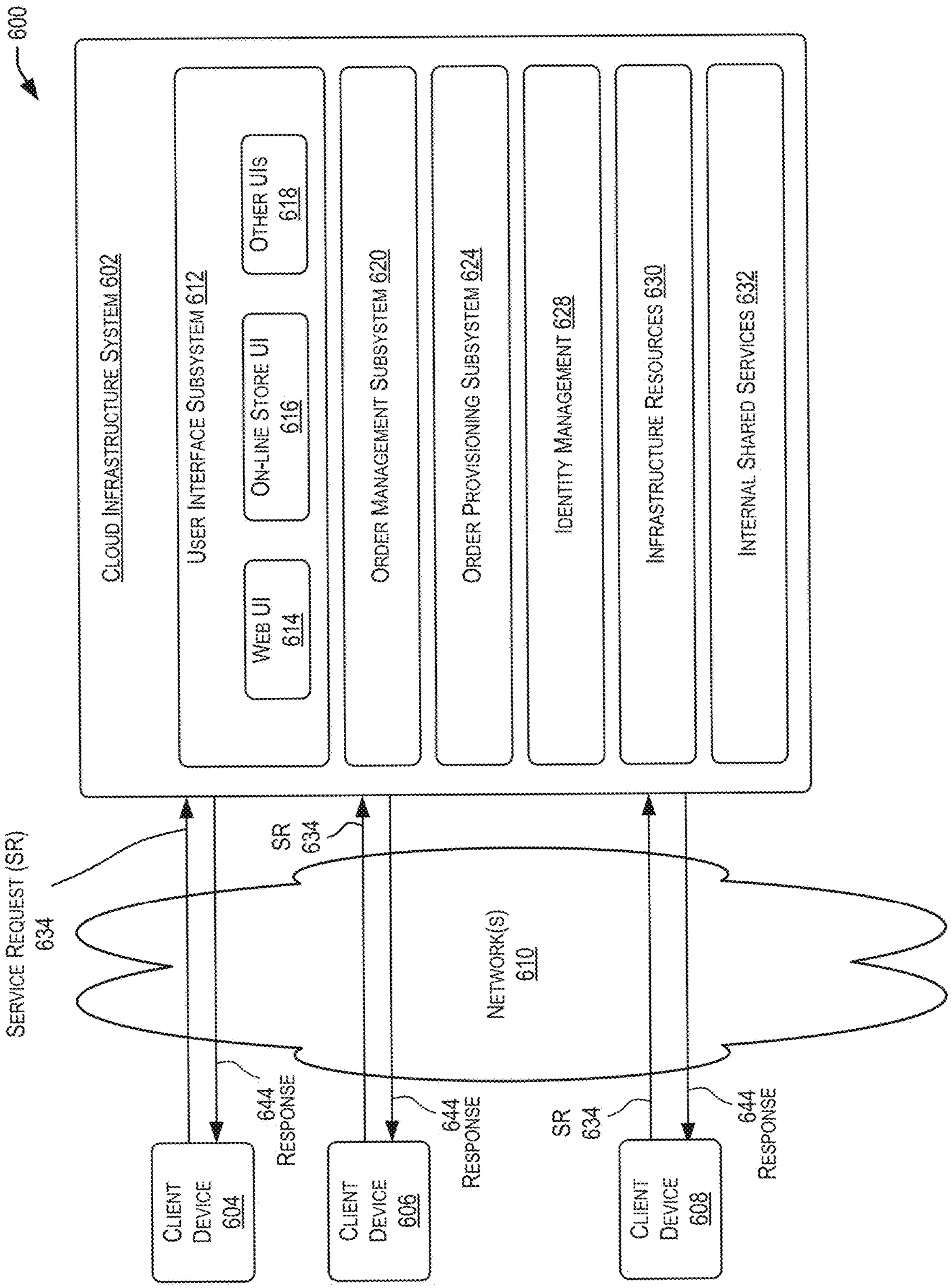
FIG. 6 is a simplified block diagram of one or more components of a system environment by which services provided by one or more components of an embodiment system may be offered as cloud services, in accordance with certain aspects.

FIG. 6 is a simplified block diagram of a cloud-based system environment in which secure execution environments may be configured in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other aspects, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative aspects.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 610 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as database services, middleware services, application services, and others.

In certain aspects, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 602. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

Cloud services are generally provided on an on-demand self-service basis, subscription-based, elastically scalable, reliable, highly available, and secure manner. For example, a tenant, via a subscription order, may order one or more services provided by cloud infrastructure system 602. Cloud infrastructure system 602 then performs processing to provide the services requested in the tenant's subscription order. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public tenant, where the tenant can be an individual or an enterprise. In certain other aspects, under a private cloud model, cloud infrastructure system 602 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602.

In some aspects, the processing performed by cloud infrastructure system 602 for providing Chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for determining the intent of an utterance. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain aspects, to facilitate efficient provisioning of these resources for supporting the various cloud services provided by cloud infrastructure system 602 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a tenant may, using a client device, request (service request 634) one or more services provided by cloud infrastructure system 602 using one or more of interfaces 614, 616, and 618. For example, a tenant may access the online store, browse cloud services offered by cloud infrastructure system 602, and place a subscription order for one or more services offered by cloud infrastructure system 602 that the tenant wishes to subscribe to. The service request may include information identifying the tenant and one or more services that the tenant desires to subscribe to. For example, a tenant may place a subscription order for a Chatbot related service offered by cloud infrastructure system 602. As part of the order, the tenant may provide information identifying for input (e.g., utterances).

In certain aspects, such as the embodiment depicted in FIG. 6, cloud infrastructure system 602 may comprise an order management subsystem (OMS) 620 that is configured to process the new order. As part of this processing, OMS 620 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 602 may send a response or notification 644 to the requesting tenant to indicate when the requested service is now ready for use. In some instances, information (e.g., a link) may be sent to the tenant that enables the tenant to start using and availing the benefits of the requested services.

Cloud infrastructure system 602 may provide services to multiple tenants. For each tenant, cloud infrastructure system 602 is responsible for managing information related to one or more subscription orders received from the tenant, maintaining tenant data related to the orders, and providing the requested services to the tenant or clients of the tenant. Cloud infrastructure system 602 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 602 may provide services to multiple tenants in parallel. Cloud infrastructure system 602 may store information for these tenants, including possibly proprietary information. In certain aspects, cloud infrastructure system 602 comprises an identity management subsystem (IMS) 628 that is configured to manage tenant's information and provide the separation of the managed information such that information related to one tenant is not accessible by another tenant. IMS 628 may be configured to provide various security-related services such as identity services, such as information access management, authentication and authorization services, services for managing tenant identities and roles and related capabilities, and the like.

Figure 7:
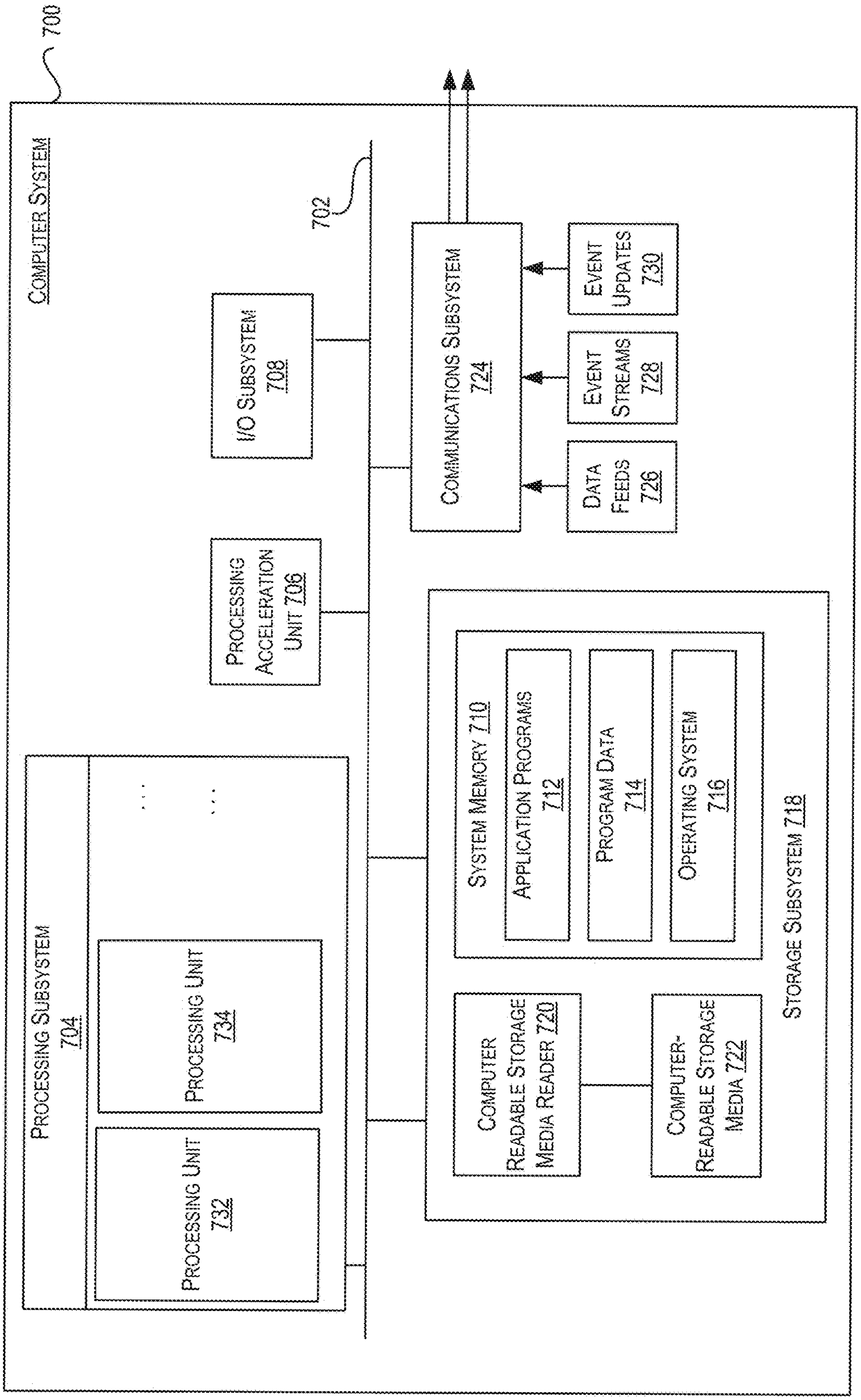
FIG. 7 illustrates an example computer system that may be used to implement certain aspects.

FIG. 7 illustrates an exemplary computer system 700 that may be used to implement certain aspects. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative aspects of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some aspects, processing subsystem 704 can include one or more special purpose co-processors such as graphics processors, digital signal processors (DSPs), or the like. In some aspects, some or all of the processing units of processing subsystem 704 can be implemented using customized circuits, such as application specific integrated circuits (ASICs), or field programmable gate arrays (FPGAs).

In some aspects, the processing units in processing subsystem 704 can execute instructions stored in system memory 710 or on computer readable storage media 722. In various aspects, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain aspects, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some aspects. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some aspects. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, digital video disc (DVD), a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 718 may also include a computer-readable storage media reader 720 that can further be connected to computer-readable storage media 722. Reader 720 may receive and be configured to read data from a memory device such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to transmit a response to a user regarding the inquiry for a Chabot.

Communication subsystem 724 may support both wired and/or wireless communication protocols. For example, in certain aspects, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 724 can provide wired network connectivity (e.g., Ethernet) in addition to or instead of a wireless interface.

Communication subsystem 724 can receive and transmit data in various forms. For example, in some aspects, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

accessing, by a cloud management system, a set of configuration parameters defining one or more constraints, including one or more data export policies, for an investigation into functionality of a collection of software;

based at least in part on the one or more constraints, generating, by the cloud management system, an investigation-bound cloud environment for conducting the investigation into functionality of the collection of software, wherein the investigation-bound cloud environment is bound by the one or more constraints; wherein the investigation-bound cloud environment is in a restricted subnet that is isolated from other cloud environments; and wherein the investigation-bound cloud environment is configured with remote access credentials;

instantiating, by the cloud management system, an instance of the collection of software in the investigation-bound cloud environment;

initiating execution, by the cloud management system, of one or more test modules within the investigation-bound cloud environment to perform one or more tests, wherein the one or more tests generate one or more test results;

causing display, on a user interface, of information about the investigation-bound cloud environment and one or more other investigation-bound cloud environments; wherein the user interface includes a remote access option for the investigation-bound cloud environment; wherein the remote access option for the investigation-bound cloud environment retrieves remote access credentials stored in association with the investigation-bound cloud environment; and wherein the remote access credentials are operable to remotely access the investigation-bound cloud environment using a remote access protocol;

determining whether the one or more test results include content that the one or more data export policies prevent from being exported outside the investigation-bound cloud environment;

in response to determining that the one or more test results do not include content that the one or more data export policies prevent from being exported outside the investigation-bound cloud environment, receiving and persistently storing the one or more test results for review in an analytic environment outside the investigation-bound cloud environment; and determining that the investigation is complete, and, in response to determining that the investigation is complete, forcing a deletion of the investigation-bound cloud environment and the restricted subnet.

2. The computer-implemented method of claim 1, wherein the one or more constraints comprise an expiration time for the investigation, the method further comprising comparing the expiration time with an up time of the investigation-bound cloud environment; wherein determining that the investigation is complete is based at least in part on the comparison.

3. The computer-implemented method of claim 1, further comprising performing one or more automated steps as part of the investigation; wherein determining that the investigation is complete comprises determining that the one or more automated steps have been completed.

4. The computer-implemented method of claim 1, wherein forcing a deletion of the investigation-bound cloud environment and the restricted subnet comprises preserving, by the cloud management system, a log of when the investigation-bound cloud environment existed and the collection of software used in the investigation-bound cloud environment.

5. The computer-implemented method of claim 1, wherein the user interface includes a displayed option to mark completion of the investigation-bound cloud environment; and wherein determining that the investigation is complete comprises accessing a user-selection of the displayed option to mark the completion of the investigation-bound cloud environment.

6. The computer-implemented method of claim 1, wherein the user interface includes a displayed option to enable Internet access for the investigation-bound cloud environment; the method further comprising configuring one or more virtual network resources in the investigation-bound cloud environment to provide monitored Internet access based at least in part on a selection of the displayed option to enable Internet access for the investigation-bound cloud environment.

7. The computer-implemented method of claim 1, wherein the user interface includes a displayed option to share access to the investigation-bound cloud environment with one or more other users; the method further comprising accessing a selection of the displayed option to share access to the investigation-bound cloud environment with a user-specified one or more other users, and, based at least in part on accessing the selection, enabling access to the investigation-bound cloud environment to the one or more other users by modifying database permissions so the investigation-bound cloud environment is an accessible database object for the one or more other users.

8. The computer-implemented method of claim 1, the method further comprising accessing a displayed option to delete a group of investigation-bound cloud environments, wherein the group of investigation-bound cloud environments includes the investigation-bound cloud environment; and wherein determining that the investigation is complete comprises accessing a user-selection of the displayed option to delete the group of the investigation-bound cloud environments.

9. The computer-implemented method of claim 1, wherein the investigation-bound cloud environment and the one or more other investigation-bound cloud environments are from different tenancies managed by a tenancy of the cloud management system, and wherein the investigation-bound cloud environment and the one or more other investigation-bound cloud environments are accessible to one or more overlapping users of the tenancy of the cloud management system.

10. The computer-implemented method of claim 1, wherein the user interface further includes an option to automatically deploy, with a single selection, a particular investigation-bound cloud environment with a predefined, non-user-specified set of configuration parameters defining one or more constraints to be placed on an investigation using a predefined, non-user-specified collection of software.

11. A computer-program product comprising one or more non-transitory machine-readable storage media, including stored instructions configured to cause a computing system to perform a set of actions including:

accessing, by a cloud management system, a set of configuration parameters defining one or more constraints, including one or more data export policies, for an investigation into functionality of a collection of software;

based at least in part on the one or more constraints, generating, by the cloud management system, an investigation-bound cloud environment for conducting the investigation into functionality of the collection of software, wherein the investigation-bound cloud environment is bound by the one or more constraints; wherein the investigation-bound cloud environment is in a restricted subnet that is isolated from other cloud environments; and wherein the investigation-bound cloud environment is configured with remote access credentials;

instantiating, by the cloud management system, an instance of the collection of software in the investigation-bound cloud environment;

initiating execution, by the cloud management system, of one or more test modules within the investigation-bound cloud environment to perform one or more tests, wherein the one or more tests generate one or more test results;

causing display, on a user interface, of information about the investigation-bound cloud environment and one or more other investigation-bound cloud environments; wherein the user interface includes a remote access option for the investigation-bound cloud environment; wherein the remote access option for the investigation-bound cloud environment retrieves remote access credentials stored in association with the investigation-bound cloud environment; and wherein the remote access credentials are operable to remotely access the investigation-bound cloud environment using a remote access protocol;

determining whether the one or more test results include content that the one or more data export policies prevent from being exported outside the investigation-bound cloud environment;

in response to determining that the one or more test results do not include content that the one or more data export policies prevent from being exported outside the investigation-bound cloud environment, receiving and persistently storing the one or more test results for review in an analytic environment outside the investigation-bound cloud environment; and determining that the investigation is complete, and, in response to determining that the investigation is complete, forcing a deletion of the investigation-bound cloud environment and the restricted subnet.

12. The computer-program product of claim 11, wherein the one or more constraints comprise an expiration time for the investigation, the set of actions further comprising comparing the expiration time with an up time of the investigation-bound cloud environment; wherein determining that the investigation is complete is based at least in part on the comparison.

13. The computer-program product of claim 11, wherein forcing a deletion of the investigation-bound cloud environment and the restricted subnet comprises preserving, by the cloud management system, a log of when the investigation-bound cloud environment existed and the collection of software used in the investigation-bound cloud environment.

14. The computer-program product of claim 11, wherein the user interface includes a displayed option to mark completion of the investigation-bound cloud environment; and wherein determining that the investigation is complete comprises accessing a user-selection of the displayed option to mark the completion of the investigation-bound cloud environment.

15. The computer-program product of claim 11, wherein the user interface includes a displayed option to enable Internet access for the investigation-bound cloud environment; the set of actions further comprising configuring one or more virtual network resources in the investigation-bound cloud environment to provide monitored Internet access based at least in part on a selection of the displayed option to enable Internet access for the investigation-bound cloud environment.

16. A system comprising:

one or more processors;

one or more non-transitory computer-readable media storing instructions, which, when executed by the system, cause the system to perform a set of actions including:

accessing, by a cloud management system, a set of configuration parameters defining one or more constraints, including one or more data export policies, for an investigation into functionality of a collection of software;

based at least in part on the one or more constraints, generating, by the cloud management system, an investigation-bound cloud environment for conducting the investigation into functionality of the collection of software, wherein the investigation-bound cloud environment is bound by the one or more constraints; wherein the investigation-bound cloud environment is in a restricted subnet that is isolated from other cloud environments; and wherein the investigation-bound cloud environment is configured with remote access credentials;

instantiating, by the cloud management system, an instance of the collection of software in the investigation-bound cloud environment;

initiating execution, by the cloud management system, of one or more test modules within the investigation-bound cloud environment to perform one or more tests, wherein the one or more tests generate one or more test results;

causing display, on a user interface, of information about the investigation-bound cloud environment and one or more other investigation-bound cloud environments; wherein the user interface includes a remote access option for the investigation-bound cloud environment; wherein the remote access option for the investigation-bound cloud environment retrieves remote access credentials stored in association with the investigation-bound cloud environment; and wherein the remote access credentials are operable to remotely access the investigation-bound cloud environment using a remote access protocol;

determining whether the one or more test results include content that the one or more data export policies prevent from being exported outside the investigation-bound cloud environment;

in response to determining that the one or more test results do not include content that the one or more data export policies prevent from being exported outside the investigation-bound cloud environment, receiving and persistently storing the one or more test results for review in an analytic environment outside the investigation-bound cloud environment; and determining that the investigation is complete, and, in response to determining that the investigation is complete, forcing a deletion of the investigation-bound cloud environment and the restricted subnet.

17. The system of claim 16, wherein the one or more constraints comprise an expiration time for the investigation, the set of actions further comprising comparing the expiration time with an up time of the investigation-bound cloud environment; wherein determining that the investigation is complete is based at least in part on the comparison.

18. The system of claim 16, wherein forcing a deletion of the investigation-bound cloud environment and the restricted subnet comprises preserving, by the cloud management system, a log of when the investigation-bound cloud environment existed and the collection of software used in the investigation-bound cloud environment.

19. The system of claim 16, wherein the user interface includes a displayed option to mark completion of the investigation-bound cloud environment; and wherein determining that the investigation is complete comprises accessing a user-selection of the displayed option to mark the completion of the investigation-bound cloud environment.

20. The system of claim 16, wherein the user interface includes a displayed option to enable Internet access for the investigation-bound cloud environment; the set of actions further comprising configuring one or more virtual network resources in the investigation-bound cloud environment to provide monitored Internet access based at least in part on a selection of the displayed option to enable Internet access for the investigation-bound cloud environment.

21. The computer-implemented method of claim 1, wherein receiving and persistently storing the one or more test results further comprises:

comparing the one or more test results with one or more limits on communication of test results data outside the investigation-bound cloud environment, the one or more limits specified within the data export policies;

determining that the one or more test results are within the one or more limits; and based further at least in part on determining that the one or more test results are within the one or more limits, receiving and persistently storing the one or more test results for review in an analytic environment outside the investigation-bound cloud environment.

* * * * *